(12) United States Patent
Pettersson et al.

(10) Patent No.: US 10,200,715 B2
(45) Date of Patent: Feb. 5, 2019

(54) METHODS AND DEVICES FOR ENCODING AND DECODING VIDEO PICTURES

(71) Applicant: Telefonaktiebolaget LM, Stockholm (SE)

(72) Inventors: Martin Pettersson, Vallentuna (SE); Kenneth Andersson, Gävle (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 323 days.

(21) Appl. No.: 15/027,749

(22) PCT Filed: Feb. 17, 2016

(86) PCT No.: PCT/SE2016/050122
§ 371 (c)(1),
(2) Date: Apr. 7, 2016

(87) PCT Pub. No.: WO2017/142448
PCT Pub. Date: Aug. 24, 2017

(65) Prior Publication Data
US 2017/0238011 A1    Aug. 17, 2017

(51) Int. Cl.
*H04N 19/573* (2014.01)
*H04N 19/159* (2014.01)
(Continued)

(52) U.S. Cl.
CPC ......... *H04N 19/573* (2014.11); *H04N 19/105* (2014.11); *H04N 19/159* (2014.11);
(Continued)

(58) Field of Classification Search
CPC .. G06K 9/6206; G06K 9/4647; G06K 9/3258; H04N 19/159; H04N 19/172;
(Continued)

(56) References Cited

U.S. PATENT DOCUMENTS

| 5,978,030 A | 11/1999 | Jung et al. |
| 2007/0268964 A1* | 11/2007 | Zhao ................. H04N 19/56 375/240.1 |

(Continued)

FOREIGN PATENT DOCUMENTS

| EP | 1094669 A1 | 4/2001 |
| EP | 1 578 135 A2 | 9/2005 |

(Continued)

OTHER PUBLICATIONS

Kordasiewicz, Roman C., et al., "Affine Motion Prediction Based on Translational Motion Vectors," IEEE Transactions on Circuits and Systems for Video Technology, vol. 17, No. 10., Oct. 2007, pp. 1388-1394.

(Continued)

*Primary Examiner* — Obafemi O Sosanya
(74) *Attorney, Agent, or Firm* — Rothwell, Figg, Ernst & Manbeck, p.c.

(57) ABSTRACT

A method (20) is disclosed performed in an encoder (40) for encoding video pictures into a video bit stream, the method (20) comprising: obtaining (21) a transformed version (2'; 12', 13') of a reference picture (2; 12, 13), by using a geometric transformation comprising at least one of: scaling, rotation, shearing, reflection, and projection; performing (22) a matching procedure at least once, the matching procedure comprising matching a reference matching area (6; 15, 16) of the reference picture (2; 12, 13) to a matching area (4; 16, 15) of a second picture (1; 13, 12) and matching a reference matching area (6'; 15', 16') of the transformed version (2'; 12', 13') to the matching area (4; 16, 15) of the second picture (1; 13, 12); and encoding (23) a block (3; 14) of the current picture (1; 11) by selecting for the block (3; 14) a first prediction area (5; 15, 16) based on the reference matching area (6; 15, 16) or a second prediction area (5'; 15', 16') based on the transformed reference matching area (6';

(Continued)

15', 16'), wherein the first and second prediction areas at least partly overlap the respective reference matching areas (6; 6'; 15, 16, 15', 16') and wherein the prediction area having lowest matching error to a corresponding matching area (4; 15, 16) of the second picture (1; 13, 12) is selected as prediction for the block. A corresponding method (30) in a decoder (50) is disclosed, and encoder (40), decoder (50), computer programs and computer program products.

42 Claims, 8 Drawing Sheets

(51) Int. Cl.
*H04N 19/172* (2014.01)
*H04N 19/30* (2014.01)
*H04N 19/44* (2014.01)
*H04N 19/105* (2014.01)
*H04N 19/176* (2014.01)
*H04N 19/85* (2014.01)
*H04N 19/53* (2014.01)
*H04N 19/56* (2014.01)

(52) U.S. Cl.
CPC ......... *H04N 19/172* (2014.11); *H04N 19/176* (2014.11); *H04N 19/30* (2014.11); *H04N 19/44* (2014.11); *H04N 19/85* (2014.11)

(58) Field of Classification Search
CPC ........ H04N 19/30; H04N 19/44; H04N 19/53; H04N 19/56
See application file for complete search history.

(56) References Cited

U.S. PATENT DOCUMENTS

| | | |
|---|---|---|
| 2008/0219574 A1 | 9/2008 | Tsubaki et al. |
| 2010/0119160 A1* | 5/2010 | Sibiryakov .......... G06K 9/4647 382/209 |
| 2011/0176611 A1 | 7/2011 | Huang et al. |
| 2012/0092329 A1* | 4/2012 | Koo ..................... G06K 9/3258 345/419 |
| 2012/0106638 A1 | 5/2012 | Su |
| 2013/0148734 A1 | 6/2013 | Nakamura |
| 2014/0146890 A1 | 5/2014 | Chiu et al. |
| 2016/0323599 A1* | 11/2016 | Lu ......................... H04N 19/53 |

FOREIGN PATENT DOCUMENTS

| | | |
|---|---|---|
| JP | 3277111 B2 | 4/2002 |
| JP | 2007-523525 A | 8/2007 |
| JP | 2012-010313 A | 1/2012 |
| JP | 2012-504878 A | 2/2012 |
| JP | 2012-532501 A | 12/2012 |
| JP | 2013-513333 A | 4/2013 |
| JP | 2013-517682 A | 5/2013 |
| WO | 2010/027137 A2 | 3/2010 |
| WO | 2010090335 A1 | 8/2010 |
| WO | 2011/002809 A2 | 1/2011 |
| WO | 2011/071514 A2 | 6/2011 |
| WO | 2011/090783 A1 | 7/2011 |

OTHER PUBLICATIONS

International Search Report issued in related International Application No. PCT/SE2016/050122, dated Dec. 21 2016, 6 pages.

Kamp, S., et al., "Decoder-Side Motion Vector Derivation for Block-Based Video Coding", IEEE Transactions on Circuits and Systems for Video Technology, vol. 22, No. 12, Dec. 2012, pp. 1732-1745.

Kamp, S., et al., "Multihypothesis Prediction Using Decoder Side Motion Vector Derivation in Inter Frame Video Coding", in Proc. SPIE Visual Cornmunicatons and Image Processing VCIP '09, San Jose, CA, Jan. 2009, 8 pages.

Kamp, S., et al., et al. "Fast decoder side motion vector derivation for inter frame video coding", in Proc. International Picture Coding Symposium PCS '09, Chicago, IL, May 2009, 5 pages.

Kamp, S., et al., "Decoder-Side Motion Vector Derivation for Hybrid Video Inter Coding", in Proc. IEEE Int. Conf. Multimedia Expo., Jul. 2010, 4 pages.

Notice of Rejection dated Mar. 20, 2018 issued in Japanese Patent Application No. 2016-520075. (10 pages).

"Algorithm Description of Joint Exploration Test Model 1 (JEM 1)", International Organization for Standardization Organisation Internationale De Normalisation, ISO/IEC JTC1/SC29/WG11, Coding of Moving Pictures and Audio (Oct. 2015). (27 pages).

Yu-Wen Huang et al., "A Technical Description of MediaTek's Proposal to the JCT-VC CfP", Joint Collaborative Team on Video Coding (JCT-VC) of ITU-T SG16 WP3 and ISO/IEC/JTC1/SC29/WG11, 1st Meeting: Dresden, DE (Apr. 2010). (6 pages).

Marco Munderloh et al., "Mesh-Based Decoder-Side Motion Estimation", Proceedings of 2010 IEEE 17th International Conference on Image Processing (ICIP 2010), IEEE (Sep. 2010). (4 pages).

* cited by examiner

METHODS AND DEVICES FOR ENCODING AND DECODING VIDEO PICTURES

CROSS-REFERENCE TO RELATED APPLICATION

This application is a 35 U.S.C. § 371 National Phase Entry Application from PCT/SE2016/050122, filed Feb. 17, 2016, and designating the United States.

TECHNICAL FIELD

The technology disclosed herein relates generally to the field of digital image processing, and in particular to a method for encoding video pictures, an encoder, a method for decoding video pictures, a decoder, and related computer programs and computer program products.

BACKGROUND

High Efficiency Video Coding (HEVC) is a standardized block-based video codec that utilizes both temporal and spatial prediction. Spatial prediction is achieved using intra prediction from within a current picture, while temporal prediction is achieved using inter prediction or bi-directional inter prediction on block level from previously decoded reference pictures. The difference between the original pixel data and the predicted pixel data, referred to as the residual (or prediction error), is transformed into the frequency domain and quantized and entropy encoded using e.g. context-adaptive variable-length coding (CAVLC) or Context-adaptive binary arithmetic coding (CABAC). The residual is thereafter transmitted to a receiving decoder together with necessary prediction parameters such as mode selections and motion vectors (all being entropy encoded). By quantizing the transformed residuals the tradeoff between bitrate and quality of the video may be controlled, wherein the level of quantization is determined by a quantization parameter (QP). The receiving decoder performs entropy decoding, inverse quantization and inverse transformation to obtain the residual. The decoder then adds the residual to an intra prediction or inter prediction in order to reconstruct a picture.

The Video Coding Experts Group (VCEG) of Telecommunication Standardization Sector of the International Telecommunications Union (ITU-T) has recently started the development of a successor to HEVC. In a first exploration phase, an experimental software codec called Key Technical Areas (KTA) is being used. KTA is based on the HEVC reference codec software HEVC Test Model (HM).

One tool that has been proposed and included in the KTA software is frame-rate up-conversion (FRUC). The FRUC tool is a motion estimation tool that derives the motion information at the decoder side. FRUC has two different modes, template matching and bilateral matching.

FIG. 1 illustrates the principle of template matching. The template matching is a digital image processing technique for finding small parts of an image that matches a template image. A current block B of a current picture is to be decoded and a search image (template A) is therefore selected. The decoder derives a motion vector by matching a template area A of the current picture (denoted Cur Pic) that is neighboring the current block B, with the same template area A in a reference picture (denoted Ref0). The prediction area in the reference picture Ref0 with the best matching template area is selected as the prediction for the current block B.

FIG. 2 illustrates the principle of bilateral matching. In bilateral matching a block (or picture) is predicted from a previous picture (Ref0) and a following picture (Ref1). A continuous motion trajectory (indicated by a dotted line in the figure) along the current block (denoted Cur block) between two blocks of the reference pictures (Ref0 and Ref1) is assumed to model linear motion. The displacement between a current block and a best matching block is the motion vector. The motion vector between the previous picture Ref0 and the current picture CurPic (the pictures having temporal difference TD0) is indicated by MV0 and the motion vector between the current picture CurPic and following picture Ref1 (the pictures having temporal difference TD1) is indicated by MV1. The motion vectors MV0 and MV1 are proportional to the temporal differences TD0 and TD1. The motion vectors along the motion trajectory that minimizes the prediction error is selected, and their corresponding reference prediction blocks are used to interpolate (or extrapolate) the prediction for the current block of the current picture CurPic.

The above described motion compensating prediction methods may give more or less accurate predictions depending on the video at hand, e.g. for videos having fast and complex changing picture, the predictions may be less accurate. For instance, the prediction for natural geometrical transformations in the video may be far from optimal and result in worse quality for a given bitrate. To have the encoder side signal information, such as scaling factors, in a bitstream to the decoder side is generally expensive in terms of bits.

SUMMARY

An objective of the present teachings is to address the above-mentioned problem and enable an improved prediction accuracy, in particular for matching methods, such as, for instance, template matching and bilateral matching.

The objective is according to an aspect achieved by a method performed in an encoder is provided for encoding video pictures into a video bit stream. The method comprises: obtaining a transformed version of a reference picture, by using a geometric transformation comprising at least one of: scaling, rotation, shearing, reflection, and projection; performing a matching procedure at least once, the matching procedure comprising matching a reference matching area of the reference picture to a matching area of a second picture and matching a reference matching area of the transformed version to the matching area of the second picture; and encoding a block of the current picture by selecting for the block a first prediction area based on the reference matching area or a second prediction area based on the transformed reference matching area, wherein the first and second prediction areas at least partly overlap the respective reference matching areas and wherein the prediction area having lowest matching error to a corresponding matching area of the second picture is selected as prediction for the block.

An advantage of the method is that the prediction of, for instance, template matching and bilateral matching is improved by applying geometrical transformations before the matching. From the improved prediction of decoder-side matching also improved compression efficiency is obtained since no extra signaling is needed when the matching search is performed both at the encoder and the decoder.

The objective is according to an aspect achieved by a computer program for an encoder for encoding video pictures into a video bit stream, the computer program comprising computer program code, which, when executed on at least one processor on the encoder causes the encoder to perform the method as above.

The objective is according to an aspect achieved by a computer program product comprising a computer program as above and a computer readable means on which the computer program is stored.

The objective is according to an aspect achieved by a encoder for encoding video pictures into a video bit stream. The encoder is configured to: obtain a transformed version of a reference picture, by using a geometric transformation comprising at least one of: scaling, rotation, shearing, reflection, and projection; perform a matching procedure at least once, the matching procedure comprising matching a reference matching area of the reference picture to a matching area of a second picture and matching a reference matching area of the transformed version to the matching area of the second picture; and encode a block of the current picture by selecting for the block a first prediction area based on the reference matching area or a second prediction area based on the transformed reference matching area, wherein the first and second prediction areas at least partly overlap the respective reference matching areas and wherein the prediction area having lowest matching error to a corresponding matching area of the second picture is selected as prediction for the block.

Advantages corresponding to the advantages mentioned for the method in an encoder is obtained also for the method in the decoder.

The objective is according to an aspect achieved by a method performed in a decoder for decoding video pictures into a video bit stream. The method comprises: obtaining a transformed version of a reference picture, by using a geometric transformation comprising at least one of: scaling, rotation, shearing, reflection, and projection; performing a matching procedure at least once, the matching procedure comprising matching a reference matching area of the reference picture to a matching area of a second picture and matching a reference matching area of the transformed version to the matching area of the second picture; and decoding a block of the current picture by selecting for the block a first prediction area based on the reference matching area or a second prediction area based on the transformed reference matching area, wherein the first and second prediction areas at least partly overlap the respective reference matching areas and wherein the prediction area having lowest matching error to a corresponding matching area of the second picture is selected as prediction for the block.

The objective is according to an aspect achieved by a computer program for a decoder for decoding video pictures from a video bit stream, the computer program comprising computer program code, which, when executed on at least one processor on the decoder causes the decoder to perform the method as above.

The objective is according to an aspect achieved by a computer program product comprising a computer program as above and a computer readable means on which the computer program is stored.

The objective is according to an aspect achieved by a decoder for decoding video pictures into a video bit stream. The decoder is configured to: obtain a transformed version of a reference picture, by using a geometric transformation comprising at least one of: scaling, rotation, shearing, reflection, and projection; perform a matching procedure at least once, the matching procedure comprising matching a reference matching area of the reference picture to a matching area of a second picture and matching a reference matching area of the transformed version to the matching area of the second picture; and decode a block of the current picture by selecting for the block a first prediction area based on the reference matching area or a second prediction area based on the transformed reference matching area, wherein the first and second prediction areas at least partly overlap the respective reference matching areas and wherein the prediction area having lowest matching error to a corresponding matching area of the second picture is selected as prediction for the block.

Further features and advantages of the present teachings will become clear upon reading the following description and the accompanying drawings.

DETAILED DESCRIPTION

Figure 1:
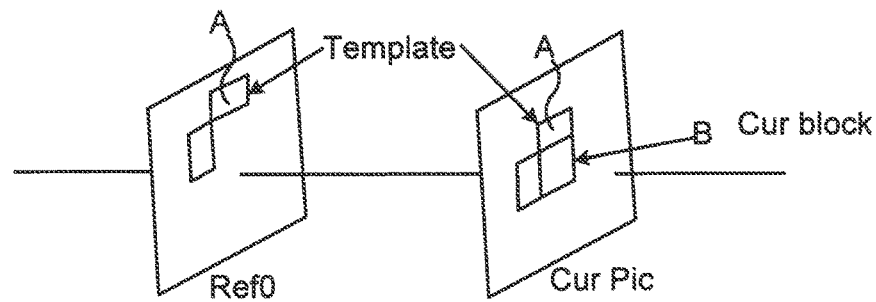
FIG. 1 illustrates the principles of template matching.
Figure 2:
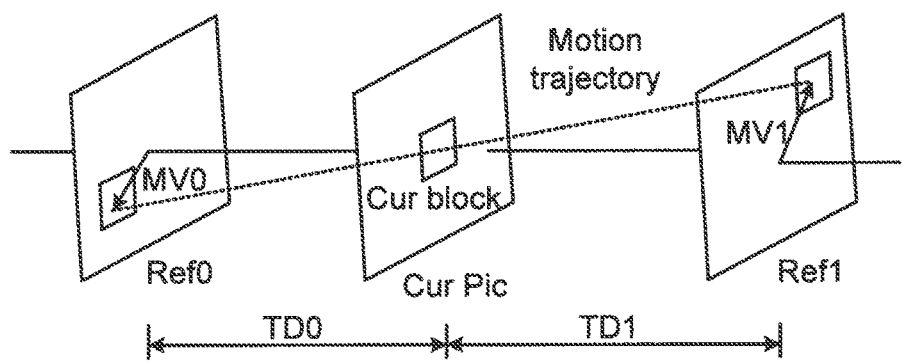
FIG. 2 illustrates the principles of bilateral matching.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Initially, a brief description on various geometric two-dimensional (2D) transformations is given. Geometric transformations of coordinates can be expressed using matrices. Some of the below transformations are linear transformations that keep the origin fixed and may be represented as 2×2 matrices while others are not. For sake of consistency all transformations below are therefore represented in matrix form using homogenous coordinates such that:

$$\begin{bmatrix} x' \\ y' \\ 1 \end{bmatrix} = M \begin{bmatrix} x \\ y \\ 1 \end{bmatrix} \quad (1)$$

All transformations are affine transformations, i.e. transformations that preserve collinearity (all points lying on a line initially still lie on a line after transformation), and preserves ratios of distances, e.g., the midpoint of a line segment remains the midpoint after transformation.

Translation (moving a point in space) may be expressed in matrix form as:

$$T = \begin{bmatrix} 1 & 0 & t_x \\ 0 & 1 & t_y \\ 0 & 0 & 1 \end{bmatrix}, \quad (2)$$

where $t_x$ is the translation in horizontal direction and $t_y$ is the translation in vertical direction.

Scaling may be expressed with the following matrix:

$$S = \begin{bmatrix} s_x & 0 & 0 \\ 0 & s_y & 0 \\ 0 & 0 & 1 \end{bmatrix}, \quad (3)$$

where $s_x$ and $s_y$ are the scaling factors in horizontal and vertical directions respectively. It is noted that scaling may also be referred to as zooming or resizing.

Rotation clockwise around the origin by an angle θ may be expressed as:

$$R_{cw} = \begin{bmatrix} \cos\theta & \sin\theta & 0 \\ -\sin\theta & \cos\theta & 0 \\ 0 & 0 & 1 \end{bmatrix} \quad (4)$$

Rotation counter-clockwise around the origin by an angle θ may be expressed as:

$$R_{ccw} = \begin{bmatrix} \cos\theta & -\sin\theta & 0 \\ \sin\theta & \cos\theta & 0 \\ 0 & 0 & 1 \end{bmatrix} \quad (5)$$

Shearing, a.k.a. skewing, parallel to the x-axis may be expressed as:

$$K_x = \begin{bmatrix} 1 & k & 0 \\ k & 1 & 0 \\ 0 & 0 & 1 \end{bmatrix} \quad (6)$$

Shearing parallel to the y-axis may be expressed as:

$$K_y = \begin{bmatrix} 1 & 0 & 0 \\ k & 1 & 0 \\ 0 & 0 & 1 \end{bmatrix} \quad (7)$$

Reflection in an arbitrary line $ax+by+c=0$ may be expressed with the following matrix in homogenous coordinates:

$$Ref(a,b,c) = \begin{bmatrix} b^2-a^2 & -2ab & -2ac \\ -2ab & a^2-b^2 & -2bc \\ 0 & 0 & a^2+b^2 \end{bmatrix} \quad (8)$$

Orthogonal projection may be expressed as a 4×4 matrix in homogeneous coordinates:

$$O = \begin{bmatrix} \frac{2}{r-l} & 0 & 0 & -\frac{r+l}{r-l} \\ 0 & \frac{2}{t-b} & 0 & -\frac{t+b}{t-b} \\ 0 & 0 & \frac{-2}{f-n} & -\frac{f+n}{f-n} \\ 0 & 0 & 0 & 1 \end{bmatrix} \quad (9)$$

where r=right, l=left, t=top, b=bottom, f=far and n=near.

As a note of vocabulary, the term "picture" is used herein. In ITU-T recommendations (e.g. H.265), it is noted that a picture may comprise a frame or a field, but that in one coded video sequence (CVS), either all pictures are frames or all pictures are fields. It may be noted that in the art, the term "frame" is often used interchangeably with the term "picture".

Briefly, the present teachings provide, in various embodiments, improvements to the prediction when using decoder-side matching such as bilateral matching or template matching. This is achieved by transforming the search area in the reference picture(s) using a geometric transformation. Thereby an improved match for the template area is obtained. The transformations may include scaling, rotation, translation, shearing, reflection and/or projection. In addition, also translation may be included as one transformation. In some embodiments, a flag may be signaled from encoder to decoder indicating whether the transformation compensation should be made or not.

Figure 3:
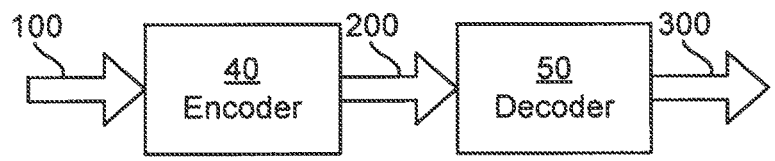
FIG. 3 illustrates schematically an environment in which embodiments disclosed herein may be implemented.

FIG. 3 illustrates schematically an environment in which embodiments disclosed herein may be implemented. An encoder 40 is used to encode an input video stream 100 to a bitstream 200 comprising encoded video. The bitstream 200 is transferred to a decoder 50 e.g. using a wireless or wired connection. The decoder 50 reads and decodes the received bitstream 200 to produce an output video stream 300 which corresponds to the input video stream 100. The encoding can be lossy, whereby the output video stream 300 is not identical to the input video stream 100. The perceived quality loss depends on the bitrate of the bitstream 200: when the bitrate is high, the encoder 40 can produce a bitstream which allows an output video stream 300 with higher quality.

The video encoding/decoding can, for instance, be based on nay of with any one of High Efficiency Video Coding (HEVC), Moving Pictures Expert Group (MPEG)-4 H.263, H.264, and MPEG-2. By providing a bitstream with reduced bitrate requirements, the resulting output video 300 can be generated with higher quality. Alternatively (or additionally), less bandwidth is needed for the bitstream 200. It is therefore advantageous to increase encoding efficiency.

In the following, various embodiments are described when applied for template matching and bilateral matching.

The same reference numerals are used consistently for examples relating to template matching, and for examples relating to bilateral matching, respectively.

Figures 4A, 4B, 4C:
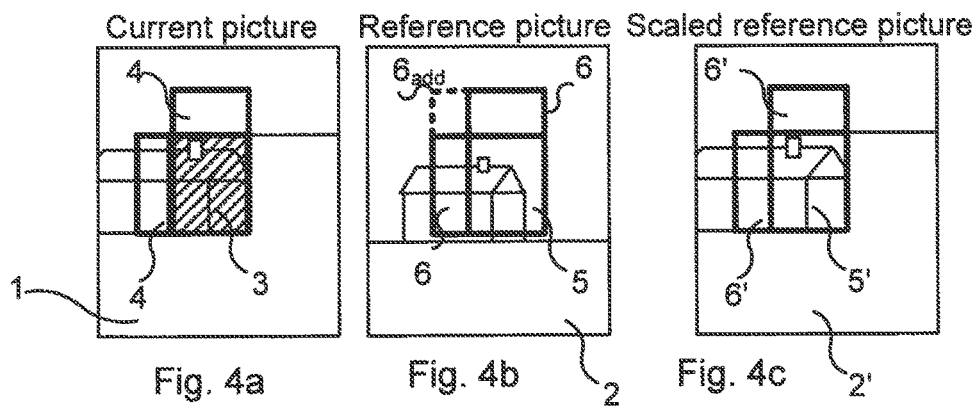
FIGS. 4a, 4b and 4c illustrate an example of scaling for template matching.

In various embodiments, the bilateral matching and template matching are extended by allowing different sizes of the blocks to be matched. This matching of differently sized blocks is achieved by scaling the reference picture before performing the matching. "Block size" may be defined as M×N pixels. The blocks to be matched have the same number of pixels, i.e. the size of the blocks as such is equal for them all, and is consequently equal to the size of the current block. The "differently sized blocks" refers to the fact that the picture has been scaled, while the size of the blocks as such have not changed or been scaled. A reference picture (or part thereof) may, for instance, be zoomed such that the matching area and the corresponding prediction area thereof still has the same pixel size as the current block (to be predicted), but the corresponding part of a non-zoomed reference picture would have a different pixel size. FIGS. 4a, 4b, 4c illustrates an example of scaling for template matching.

FIG. 4a illustrates a current picture 1 which is to be decoded. The current picture 1 comprises a reference area comprising a current block 3 to be decoded and two neighboring matching areas 4, i.e. being adjacent the block 3 to be decoded. In template matching the matching area 4 is typically denoted template area, and this latter vocabulary is, without loss of generality, used in the following for the description of FIGS. 4a, 4b and 4c.

FIG. 4b illustrates a reference picture 2. The reference picture 2 comprises two reference template areas 6, which are adjacent to a prediction area 5. The reference template areas 6 may be used in a matching procedure for finding a prediction for a block 3 (not known, hence hatched) of the current picture 1 (FIG. 4a), which block 3 is to be encoded. It is noted that two template areas are used herein purely to describe and exemplify different embodiments. The number of reference template area(s) 4 may in practice be different than the two used herein. For instance, an additional reference template area $6_{add}$ (see FIG. 4b) could be used, and such additional reference template areas could be located anywhere adjacent to the prediction area 5.

In FIG. 4c, a scaled reference picture 2' is shown. The scaled reference picture 2' is a scaled version of the reference picture 2. The scaling, or more generally a geometric two-dimensional (2D) transformation, may be performed in any known manner, e.g. according to any of the initially mentioned geometric two-dimensional (2D) transformations (translation, scaling, rotation etc.). The scaled reference picture 2' comprises two scaled reference template areas 6', which are adjacent to a scaled prediction area 5'. As a note of vocabulary it is noted that "scaled reference template area" refers to the fact that the picture has been scaled, but that the size of the reference template area as such has not changed or been scaled.

FIG. 4b illustrates the case wherein the scene is zoomed out compared to the current picture 1 (FIG. 4a), and it is therefore not possible to find a good match in the reference template areas 6 of the reference picture 2. The reference picture 2 may be scaled to a set of predefined resolutions before the template matching is performed. Particular examples of scaling factors comprise values selected among: {0.5, 0.65, 0.75, 0.85, 0.9, 0.95, 0.98, 0.99, 1.01, 1.02, 1.05, 1.11, 1.18, 1.33, 1.53, 2.0}. The scaling factors in this particular exemplary set have been selected such that a larger part of them are close to 1, i.e. have no or little scaling, since it may be more likely that a zoom occurs in small steps. However, it is noted that any scaling factor can be used.

FIG. 4c illustrates the scaled reference picture 2' when the picture has been scaled with a factor of 1.33. The scaled reference template areas 6' now match better with the template areas 4 of the current picture 1. In practice the optimal scaling factor is likely to be close or very close to 1 for reference pictures that are close to each other in presentation time. In some embodiments, the reference picture 2 is scaled using the same scaling factor in both horizontal and vertical directions. However, in other embodiments, different scaling factors are used for the horizontal and vertical directions.

In order to reduce the number of scaling factors to test, the scaling factors may be selected according to the (temporal) distance to the reference picture 2 such that large scaling factors may be omitted for reference pictures 2 that are closer in presentation time, and conversely, small scaling factors may be omitted for reference pictures 2 that are farther apart in presentation time. Moreover, the scaling factor derived in previously decoded (spatially or temporally) neighboring blocks may be used as a starting point for the search. The scaling factor may also be found at picture level if there is global zoom present.

For each scaling factor, the search area (i.e. the reference template areas 6 and the prediction area 5) of the reference picture 2 may be scaled to the new scale. The scaling, i.e. the resizing of the search area, may be performed in different ways. The scaling may be performed using, for each respective scaling factor, an interpolation filter to generate a filtered reference sample that corresponds to the sample of the current picture 1. This gives a set of scaled samples (each scaled sample having a particular scaling factor) of the search area.

Examples of (software) filters or scaling algorithms (i.e. examples on ways of resizing), that may be used comprise nearest neighbor filter, a bilinear filter or bi-cubic interpolation filter or Discrete Cosine Transform interpolation filter (DCT-IF) filters such as the one used in HEVC; however, it is noted that in principle any filter may be used as long as both encoder and decoder use same filters. Any accuracy of the scaled samples may also be used as long as both encoder and decoder use the same accuracy. One particular example of accuracy is quarter sample resolution, which is used in HEVC. However, it is noted that finer or coarser sampling could be used. An algorithm may be seen as a set of instructions, stored e.g. on computer readable storage medium.

Template matching may be applied in order to find the best template match for the scaled reference picture 2'. The search is performed within a selected motion vector search range, i.e. the motion vector range defines the search area. The motion vector search range may be different depending on the scaling factor of the scaled reference picture. An initial motion vector for the search may be selected such that it is proportional to the current scaling factor, i.e. the input candidate motion vector may be scaled according to the scaling factor. The scaling may be performed either as a pre-pass, that is, as an algorithm or set of instructions, before the template matching or be performed as part of the template matching. As is known within the art, an encoder may use two or more "passes" when encoding a picture or set of pictures. For instance, in a first "pass" statistics may be collected and a first round of mode decisions can be made based thereon, and correspondingly, in a subsequent second "pass" a full encoding with refined encoding decisions can be made using rate-distortion optimization. Having several such "passes" entails advantages such as giving better coding decisions based on statistics, improved bitrate control, improved quality of the video. In some embodiments, the scaling may therefore be performed in one or more passes in order to e.g. improve the quality of the video.

In some embodiments, in order to speed up the matching procedure, only a subset of the scaled samples may be used for some steps of the matching procedure, e.g. during a first coarse search. The subset may, for instance, be selected as every second or every fourth picture, only the outer region of the matching area or in some other predefined way. To further reduce complexity, a coarse search may also use all scaled samples or only a subset of the scaled samples but at integer sample accuracy. This reduces the complexity by avoiding filtering of the reference samples. A finer search could then refine the reference samples with sub sample accuracy.

When the best template match has been determined the prediction area 5' of the scaled reference picture 2' is used for predicting the current block 3 of the current picture 1. In this context it is noted that a "best match" (minimizing an error) may, for instance, be defined as the first template match fulfilling a criterion such as Sum of Absolute Differences (SAD)<threshold. As another example, a match may be considered the best match e.g. when the mean squared error (MSE) is minimized for the template area. MSE between a rectangular block I of size m×n pixels and a rectangular block K of size m×n pixels may be calculated according to:

$$MSE = \frac{1}{mn}\sum_{i=0}^{m-1}\sum_{j=0}^{n-1}[I(i,j)-K(i,j)]^2$$

Below a pseudo code is provided describing how the prediction area (also denoted prediction block) may be derived on both the encoder and the decoder side when using scaling with template matching:

for each block
  for each scaling factor
    scale reference picture using scaling factor
    for each motion vector
      check match of template between current picture and scaled reference picture if best match
      store prediction block Best match can for example refer to the scaling factor that produces the least sum of absolute valued differences between samples of the template area 4 of the current picture 2 and corresponding samples of the scaled reference template area 6', or least sum of squared differences between samples of the template area 4 of the current picture 2 and corresponding samples of the scaled reference template area 6'.

In another embodiment, only the template area 6 is scaled and not the prediction area 5 before doing the matching. Once the best template match is found, the corresponding prediction area 5 in the reference picture 2 is scaled to fit the current block 3.

Figure 5:
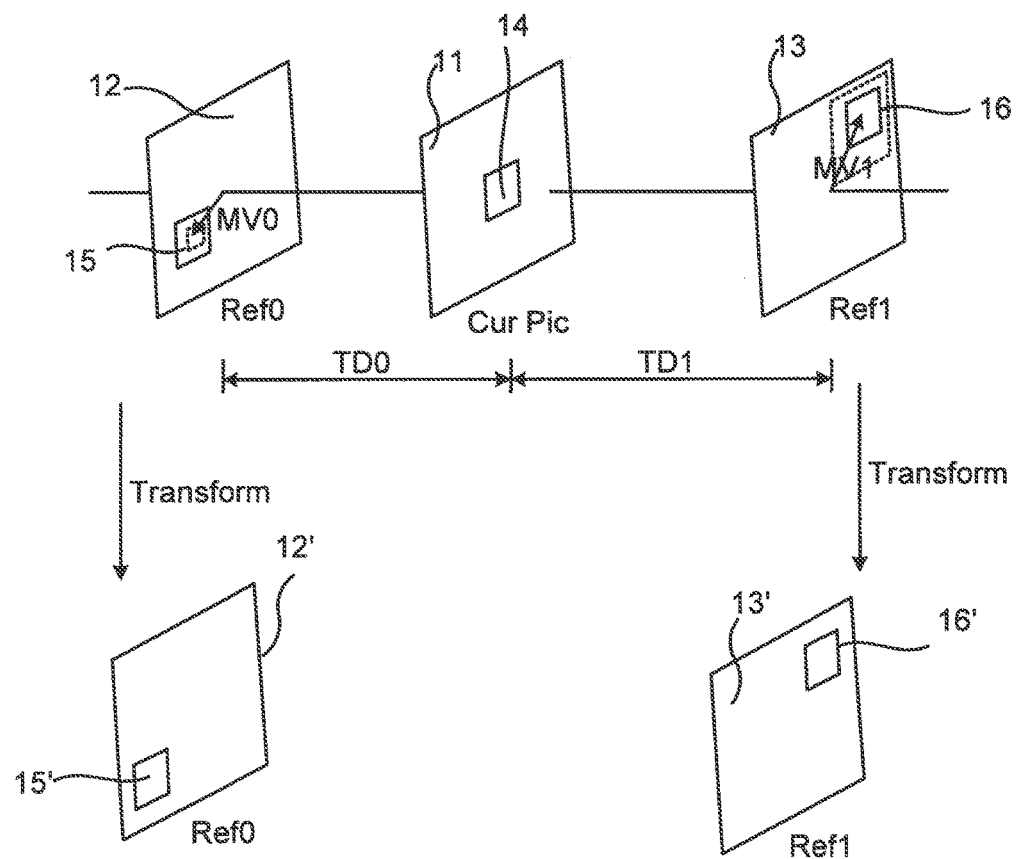
FIG. 5 illustrates an example of transforming for bilateral matching.

FIG. 5 illustrates an example of transforming for bilateral matching, and in particular an example of using a scaling factor. A previous frame Ref0 (indicated at reference numeral 12), in particular any picture 12 preceding the current picture CurPic (indicated at reference numeral 11) in display order, and/or a following picture Ref1 (indicated at reference numeral 13), in particular any picture 13 subsequent to the current picture 11 in display order, may be transformed using any of the mentioned geometrical transformations. This gives transformed versions 12', 13' of the reference pictures 12, 13, and corresponding transformed matching areas 15', 16'. In this context, it is also noted that, for bilateral matching, both of the reference pictures 12, 13 may, in some embodiments, be pictures following the current picture 11 in display order but preceding the current picture 11 in decoding order. In yet other embodiments, both reference pictures 12, 13 are preceding the current picture 11 both in display order and decoding order. A prediction for the current block 14 in the current picture 11 may then be extrapolated from these two reference pictures 12, 13.

In FIG. 5, the matching area 15 of the previous reference picture 12 has been scaled (in particular reduced in scale), and the matching area 16 of the following reference picture 13 has also been scaled (in particular enlarged in scale). These geometrical transformations (here, scaling) of the matching areas 15, 16 are indicated in the figure by the respective dotted rectangles in the reference pictures 12, 13. The block size of the matching areas 15, 15', 16, 16' as such is unchanged, as indicated by the equally sized blocks 15, 15', 16, 16' drawn in solid lines. That is, the block size of the geometrically transformed matching areas 15', 16' as well as the non-transformed matching areas 15, 16 is the same. At the bottommost part of FIG. 5 the transformed matchings areas 15', 16' are shown.

The block 14 of the current picture 11 to be predicted may be predicted from the matching areas 15, 16 of the reference pictures 12, 13, or according to the present teachings, from the transformed matchings areas 15', 16' of the transformed reference pictures 12', 13'. There are several options here, giving several embodiments. In some embodiments, only one of the two reference pictures 12, 13 is geometrically transformed, in other embodiments, both reference pictures 12, 13 are transformed and used in the matching procedure. An object may have been geometrically transformed between the current picture 11 and one of the reference pictures 12 but not relatively the other reference picture 13. Hence, any combination of selected first prediction area 15, 15' or selected second prediction area 16, 16' can be combined in the matching procedure.

Figure 6:
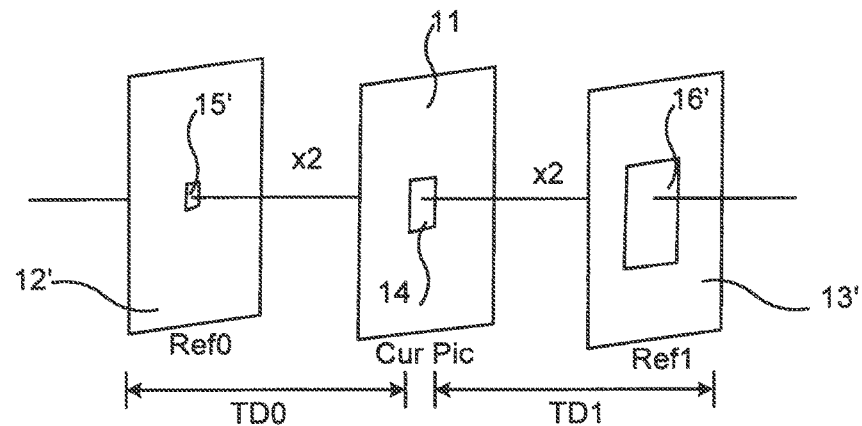
FIG. 6 illustrates an example of constant scaling factor for bilateral matching.

FIG. 6 illustrates an example of the above described constant scaling factor being equal to scaling factor of x2 for bilateral matching. For bilateral matching there are two reference pictures Ref0, Ref1 available for finding the matching block for the current picture 11 (also indicated by Cur Pic in the FIG. 6). The previous reference picture 12 is, as described with reference to FIG. 5, any picture preceding the current picture 11, and the following reference picture 13 is any picture subsequent to the current picture 11. Assuming continuous zoom between the first (previous) transformed reference picture 12' and the second (following) transformed reference picture 13', the scaling factor will be proportional to the distance TD0 between the first transformed reference picture 12' and current picture 11 and to the distance TD1 between the current picture 11 and the second transformed reference picture 13'. In the special case where TD0 equals TD1, the scaling factor will be the same. It is again noted that the example of FIG. 6 is given purely as an example, and that in other embodiments, only one of the first and second reference pictures 12, 13 could be transformed.

Figure 7:
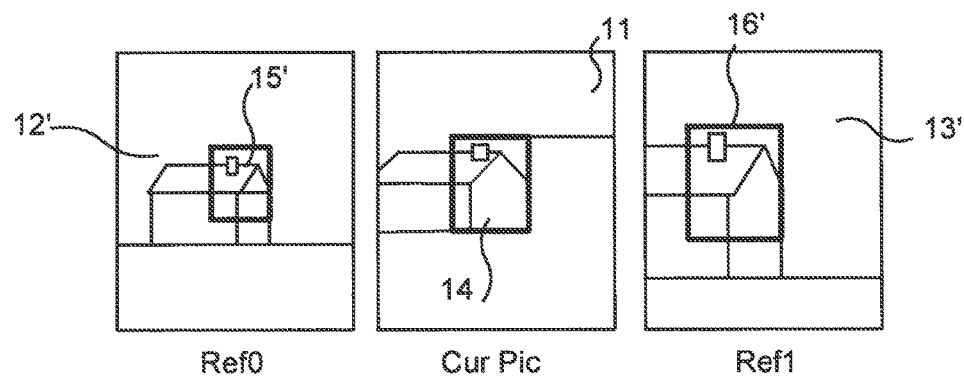
FIG. 7 illustrates an example of scaling for bilateral matching.

FIG. 7 illustrates a specific picture for illustrating the above described scaling for bilateral matching. Geometrically transformed versions 12', 13' are obtained for the respective reference pictures 12, 13. The current picture 11 comprises a current block 14 which is to be decoded. The first geometrically transformed (in particular scaled) reference picture 12' comprises a first scaled reference matching area 15' and the second geometrically transformed (also scaled) reference picture 13' comprises a second scaled reference matching area 16'. The current block 14 is interpolated from the differently scaled versions of the first and second matchings areas 15', 16'. This clearly gives an improved accuracy compared to the case of not performing any geometrical transformation.

In some embodiments, the selection of the starting position for the motion vector search, i.e. the search for the motion vector along the motion trajectory that minimizes the prediction error in the matching, is (approximately) the center of the zoom.

In the present description, "zoom" is categorized into global zoom and local zoom. Global zoom, e.g. camera zoom, affects all parts of the picture. Local zoom affects only some parts of a picture, such as when an object (e.g. football) of the picture moves towards or away from the camera.

For global zoom it is possible to find the scaling factor and center of zoom at the picture level at the encoder side. An efficient way to do so is to subsample the first and second reference pictures 12, 13 and the current picture 11 and iteratively test different scaling factors and displacement vectors until the best match is found. This could then be repeated for the full resolution picture with a scaled version of the best match from the search in the subsampled picture as starting point.

Assuming that the center of the zoom is in the origin and that the distances TD0 and TD1 between the first and second reference pictures 12, 13 and the current picture 11 are the same, the following conditions are true:

$$zv_{cur}=zv_0*s=zv_0'=zv_1/s=zv_1' \quad (10),$$

where $zv_{cur}$ is the distance to the zoom center of the current picture 11, $zv_0$ is the distance to the zoom center for the previous reference picture 12, s is the scale factor, $zv_1$ is the distance to the zoom center for the following reference picture 13, $zv_0'$ is the scaled distance to the zoom center for the previous reference picture 12 and $zv_1'$ is the scaled distance to the zoom center for the following reference picture 13.

An unscaled total motion vector $tv_0$ that combines the natural motion $mv_0$ with the motion from zoom for the first reference picture 12 could then be described as:

$$tv_0=mv_0+zv_0-zv_{cur} \quad (11)$$

The corresponding total motion vector $tv_1$ that combines the natural motion $mv_1$ with the motion from zoom for the first reference picture 12 could be described as:

$$tv_1=mv_1+zv_1-zv_{cur} \quad (12)$$

The above described motion vectors are the motion vectors that would likely be selected if no scaling or bilateral matching would be involved.

Figure 8:
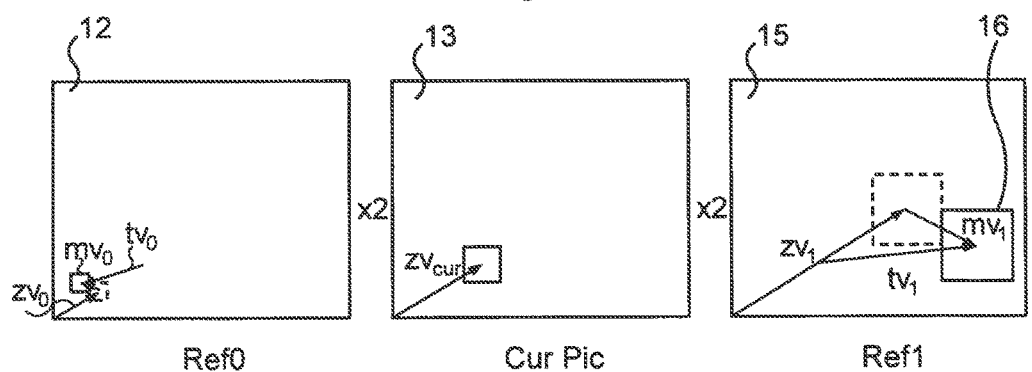
FIG. 8 illustrates motion vectors without scaling or bilateral matching.

FIG. 8 illustrates motion vectors without scaling or bilateral matching. The picture has been zoomed in a factor 2 between the first reference picture 12 and the current picture 11 and also between the current picture 11 and the second reference picture 13. The distance from the respective block 15, 14, 16 to the center of the zoom (put in the origin) is shown with the zoom vectors $zv_0$, $zv_{cur}$ and $zv_1$. The natural motion of the first reference block 15, $mv_0$, and of the natural motion of the second reference block 16, $mv_1$, as well as the total motion vectors $tv_0$ and $tv_1$, are shown in the reference pictures 12, 13.

By scaling the reference picture(s) 12, 13 with the center of the zoom as the origin, the displacement of a block 15, 16 due to zoom will be corrected. The scaled total motion vectors $tv_0'$ and $tv_1'$ then becomes:

$$tv_0'=s*mv_0+zv_{cur}-zv_0'=s*mv_0=mv_0'$$

and $$tv_1'=mv_1/s+zv_{cur}-zv_1'=mv_1/s=mv_1'$$

Under the assumption of continuous natural motion the natural motion vectors $mv_1'$, $mv_0'$ would be proportional to the distances TD0 and TD1 and in the special case where TD0 equals TD1, then:

$$mv_1'=-mv_0'$$

Figure 9:
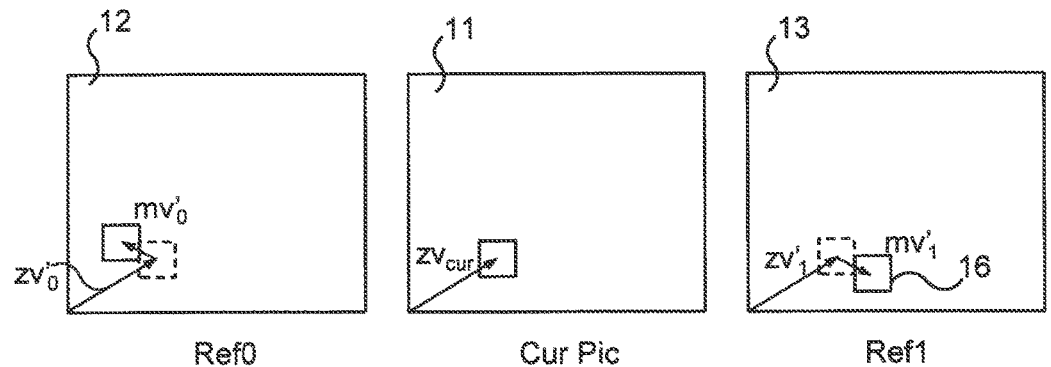
FIG. 9 illustrates an example of scaling of reference pictures for bilateral matching.

FIG. 9 illustrates the above. By scaling the reference pictures 12, 13 using a scaling factor, the size of the objects in the picture and distance to the center of the zoom becomes the same as in the current picture 11. Therefore, no initial displacement vector is needed. Assuming continuous motion the new scaled motion vectors $mv_0'$ and $mv_1'$ will be proportional to the distances TD0 and TD1 between the reference pictures 12, 13 and the current picture 11. In the case these distances are the same, the scaled motion vectors will be mirrored.

In bilateral matching the best match can for example, and as mentioned earlier, refer to the scaling factor that produces the least sum of absolute valued differences between scaled samples of the Ref0 and corresponding scaled samples of the Ref1 or least sum of squared differences between scaled samples of the Ref0 and corresponding scaled samples of Ref1.

In some embodiments according to the present teachings, the template matching and the bilateral matching are extended by allowing rotation of the blocks to be matched.

Figure 10:
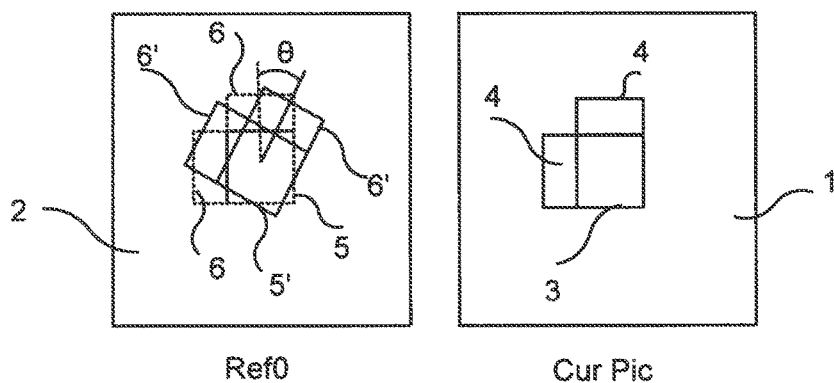
FIG. 10 illustrates template matching with rotation.

FIG. 10 illustrates rotation for template matching. The template area(s) 6 (also denoted matching area(s) as noted earlier) and the prediction block 5 (drawn by dashed lines) of the reference picture 2 are rotated with an angle θ around the center of the prediction block 5 using a translated modification of equation (4). This gives geometrically transformed template area(s) 6' and prediction area 5' (drawn by solid lines). Alternatively the template area 6 of the reference picture 1 is rotated before trying to match the areas 4, 6'. A set of plausible angles to try out in the template matching could include {−45, −30, −20, −13, −8, −5, −3, −2, −1, 1, 2, 3, 5, 8, 13, 20, 30, 45}. In practice the optimal rotation angle is likely to be very close to 0 for pictures that are close to each other in presentation time. The angles to test could be selected according to the distance to the reference picture 2 such that for reference pictures that are closer in presentation time large angles may be skipped. Moreover, the angle used in previously decoded (spatially or temporally) neighboring blocks may be used as a starting point in the search for the best match.

Figure 11:
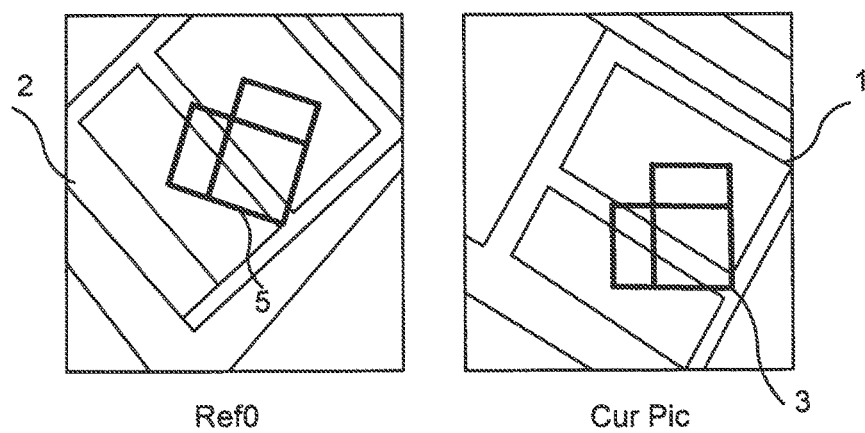
FIG. 11 illustrates an example of template matching with rotation.

FIG. 11 illustrates with an exemplifying picture an example of template matching in which rotation is applied. As can be seen, the prediction area 5 of the reference picture 2 matches the block 3 to be decoded of the current picture 1 better than if no rotation would be applied. The reference picture 2 may be rotated with another angle if the match does not fulfil a desired accuracy, until such accuracy is reached.

Below pseudo code is provided describing how the prediction block could be derived on both the encoder and the decoder side when using rotation:

for each block
  for each angle
    rotate reference picture using angle for each motion vector
    check match of template between current picture and rotated reference picture if best match
        store prediction block Best match can for example refer to the rotation that produces the least sum of absolute valued differences between samples of the template area 4 of the current picture and corresponding samples of the rotated reference template area 6' or least sum of squared differences between samples of the template area 4 of the current picture and corresponding samples of the rotated reference template area 6'.

Figure 12:
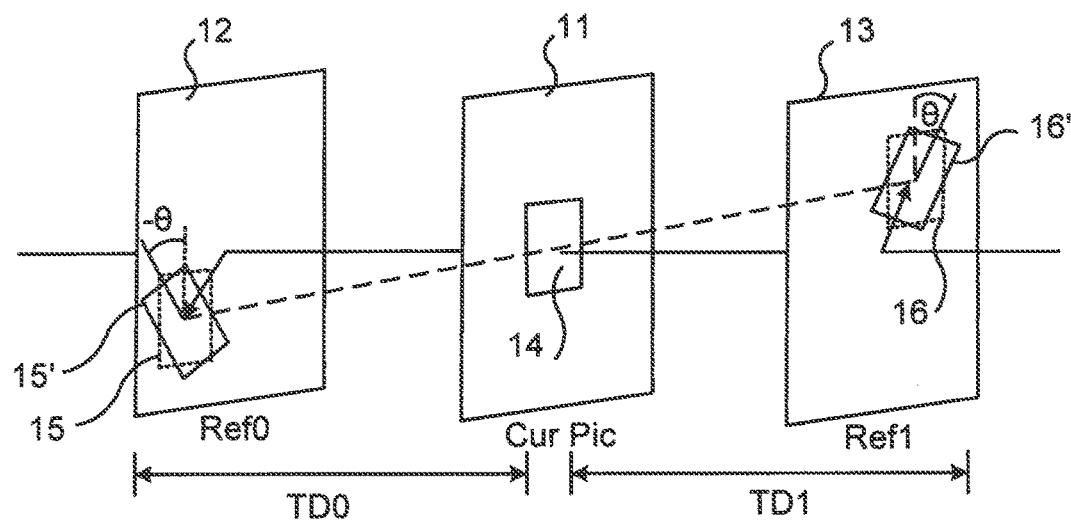
FIG. 12 illustrates an example of bilateral matching with rotation.

FIG. 12 illustrates an example of bilateral matching with rotation. The transformed and non-transformed reference matching areas 15', 15 of the first reference picture 12 are illustrated by solid lines and dashed lines, respectively. Correspondingly, the transformed and non-transformed reference matching areas 16', 16 of the second reference picture 13 are also illustrated by solid lines and dashed lines, respectively. Assuming a continuous rotation, the angle θ should be proportional to the temporal distances TD0 and TD1 between current picture 11 and the first and second reference pictures 12, 13. In the special case where TD0 is equal to TD1 then the rotation angle −θ between Ref0 and current picture 11 is equal to the rotation angle θ between current picture 11 and the second reference picture 13.

The embodiments comprising rotation have been described above in terms of the matching area and the prediction area having been rotated for the reference pictures, while the rest of the reference pictures have not. Stated differently, the reference pictures or part of the reference pictures are rotated (with an opposite angle) while the matching area and prediction area are static.

If the center of rotation is known the reference picture 12, 13 could be corrected similar to as for the scaling case to get a proper starting position for the search of the best match. The center of rotation could for instance be calculated at a global scale (rotation of the picture) or from a previously found rotation block and its reference block. In bilateral matching best match can for example (and as mentioned earlier) refer to the rotation that produces the least sum of absolute valued differences between rotated samples of the first reference picture 12 and corresponding rotated samples of the second reference picture 13 or least sum of squared differences between rotated samples of the first reference picture 12 and corresponding rotated samples of the second reference picture 13.

In another more generalized embodiment of the current invention the reference picture(s) 12, 13 may be transformed using any geometric transformation M before template matching or bilateral matching is performed. Examples of geometric transformations apart from used examples of scaling and rotation comprise translation, shearing (skewing), reflection and orthogonal projection as described earlier.

In various embodiments a more general geometric transformation could thus be used (as opposed to the given specific examples thereof). The geometric transformation could be one of the above or a combination of one or several of the above geometric transformations, i.e. the geometric transformation M could be a composite of one or many geometric transformations. For instance, M could be:

$$M = RST$$

where R is a rotation matrix, S a scaling matrix and T a translation matrix.

Testing all possible combinations of the rotation angle θ, scaling factors sx and sy, and translation motion vectors tx and ty may be rather complex when doing template matching or bilateral matching. Instead, a sparse subset of the possible combinations could be selected to be tested in the template matching or bilateral matching.

The sparse subset of the possible combinations could also depend on the distance to the reference picture(s) such that larger changes (scaling, rotation, motion, etc) would be expected from reference pictures further away from the current picture compared to reference picture(s) closer in presentation time to the current picture. For instance, fewer combinations could be tested for a reference picture that is closer in time.

In some embodiments, a part of the block is intra coded. In this embodiment a part of the current block (e.g. a sub-block or a small set of pixels at the bottom/right side in a current block or a sparse selection of pixels) is encoded using intra-coding. This may be useful when it is not possible to get a good match with normal template matching. By intra coding part of the current block it could be possible to get better fixation points for the template matching since the matching is done for what is in the current block. In variations of this embodiment, an intra coding mode is signaled to the decoder relating only to the overlapping part in the current block.

In the following various features and embodiments are described, and it is noted that they can be combined with the use of template matching as well as with the use of bilateral matching. Further, the reference numerals refer to FIGS. 4a, 4b, 4c and FIG. 5 for embodiments in which temporal matching and bilateral matching may be used.

Hence, in variations of the embodiments described thus far, giving further embodiments, some signaling may be used. The idea of template matching is to remove the need to signal certain information in the bitstream such as motion vectors, and in for the embodiments of the present teachings, scaling parameters, rotation parameters and other transformation parameters.

Still, there may be a need to signal when to use template matching and what to use template matching for (e.g. translation, scaling, rotation, etc). Moreover, it may be beneficial to signal the number of combinations to test in the matching procedure. This information may be signaled at sequence level such as in Sequence Parameter Set (SPS), picture level such as in Picture Parameter Set (PPS), slice level or block level.

In some embodiments, a number of candidate prediction areas are obtained from the template matching. The index for the candidate prediction area to use is then signaled from the encoder to the decoder in the bitstream. Since the steps of the disclosed template matching procedure on the encoder side correspond to the steps at the decoder side, the same set of candidates are derived at the decoder side. Therefore, the encoder can do the matching, and then signal the decoder about which candidate to use. This reduces processing need at the decoder side.

In some embodiments, in order to lower the decoder side complexity when implementing the described method (in the various embodiments), it can be beneficial to perform the matching in lower resolution than the actual coding. For example, the reference picture and template area could be downscaled by a factor of two in both directions, leading to a 75% reduction in the number of pixels to be matched.

In other embodiment, also in order to reduce the decoder side complexity of implementing the described embodiments, a search strategy may be used. For instance, it can be beneficial to perform the matching to find the geometric transformation in two search steps. In a first search step the N best matches for a search region with coarse sample accuracy (for example integer) of the resampled reference samples is selected. In a second step the N best matches are refined using a final sample accuracy (for example quarter sample) of the resampled reference samples. The geometric transformation with the best match in the second step is selected. The N best matches can be determined for example by using Sum of Absolute Differences (SAD) or weighted SAD. By using weighted SAD it is intended to give a larger weight to coarse samples that are closer to the final samples than to coarse samples that are further away from the final samples.

In alternative embodiments, the first search is performed at both encoder and decoder giving N candidates. Then the second search is only performed at the encoder and the candidate to use is signaled to the decoder when the method is used. The decoder thus only need to perform resampling to final sample accuracy of the reference samples for the selected candidate.

The features and embodiments that have been described may be combined in different ways, as have been indicated earlier. In the following further examples of various combinations are given.

Figure 13:
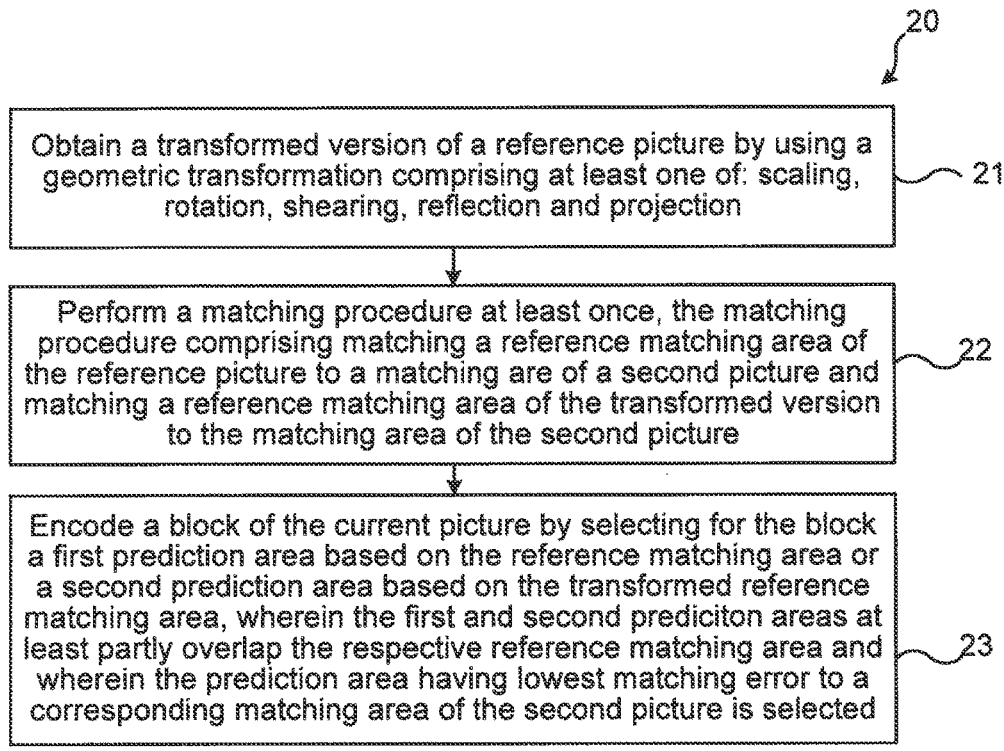
FIG. 13 illustrates a flow chart over steps of a method in an encoder in accordance with the present teachings.

FIG. 13 illustrates a flow chart over steps of a method 20 in an encoder in accordance with the present teachings.

The method 20 may be performed in an encoder 40 for encoding video pictures into a video bit stream. The method 20 comprises obtaining 21 a transformed version 2'; 12', 13' of a reference picture 2; 12, 13, by using a geometric transformation comprising at least one of: scaling, rotation, shearing, reflection, and projection. The geometric transformation to use may be any combination of scaling, rotation, shearing, reflection, and projection. Further, it is noted that the geometric transformation may also comprise translation in addition to at least one of scaling, rotation, shearing, reflection, and projection.

The method 20 comprises performing 22 a matching procedure at least once, the matching procedure comprising matching a reference matching area 6; 15, 16 of the reference picture 2; 12, 13 to a matching area 4; 16, 15 of a second picture 1; 13, 12 and matching a reference matching area 6'; 15', 16' of the transformed version 2'; 12', 13' to the matching area 4; 16, 15 of the second picture 1; 13, 12.

The method 20 comprises encoding 23 a block 3; 14 of the current picture 1; ii by selecting for the block 3; 14 a first prediction area 5; 15, 16 based on the reference matching area 6; 15, 16 or a second prediction area 5'; 15', 16' based on the transformed reference matching area 6'; 15', 16', wherein the first and second prediction areas at least partly overlap the respective reference matching areas 6; 6'; 15, 16, 15', 16' and wherein the prediction area having lowest matching error to a corresponding matching area 4; 15, 16 of the second picture 1; 13, 12 is selected as prediction for the block.

The method 20 provides several advantages. For instance, by applying geometrical transformations before the matching, the prediction of template matching and bilateral matching is improved. This in turn means improved compression efficiency as no extra signaling is needed when the matching search is performed both at the encoder and the decoder.

In an embodiment, the obtaining 21 a transformed version 2'; 12', 13' of the reference picture 2; 12, 13 comprises transforming only the reference matching area 6; 15, 16 and the prediction area.

In an embodiment, the method 20 comprises performing 22 the matching procedure in a lower resolution than the encoding 23.

In various embodiments, the performing the matching procedure comprises obtaining a first set of matches for the reference matching area 6; 15, 16 by using a first sample accuracy and refining the matches of the first set using a second sample accuracy, and wherein the encoding 23 comprises selecting the prediction area among the first set of matches for which the second sample accuracy was used.

In a variation of the above embodiment, the method 20 comprises signaling, to the decoder, information about a candidate match to use among the first set of matches for which the second sample accuracy was used.

In various embodiments, the method 20 comprises signaling, to a decoder 50, information about the geometric transformation to use in the matching procedure the information comprising one or more of: number of combinations to use in the matching procedure, a set of suggested candidate prediction areas, scaling factors to use and angles to use.

In various embodiments, the method 20 comprises signaling, to a decoder 50, an index for a candidate prediction area to use for decoding a block 3; 14 among a set of selected candidate predictions derived at the decoder 50 during a matching procedure.

In various embodiments, the matching procedure comprises a bilateral matching, and wherein:
the second picture 13, 12 comprises a second obtained reference picture 13, 12 or a transformed version 13', 12' of the second obtained reference picture 13, 12, wherein the method 20 comprises, during the encoding 23 the block 14:
selecting a third reference prediction area at least partly overlapping a second reference matching area of the second reference picture 13, 12, or a fourth prediction area at least partly overlapping a second reference matching area of the transformed version 13', 12' of the second reference picture 13, 12,
deriving a fifth prediction area based on the selected first prediction area and the selected third prediction area or the selected second prediction area and the selected fourth prediction area, and
selecting the fifth prediction area for encoding 23 the block 14 of the current picture 11.

It is noted that various combinations are conceivable. An object may have been geometrically transformed between the current picture 11 and one of the reference pictures 12 but not relatively the other reference picture 13. Hence, any combination of selected first prediction area 15, 15' or selected second prediction area 16, 16' can be combined with any of selected third prediction area or selected fourth prediction area.

In various embodiments, the matching procedure comprises a template matching. The second picture then comprises the current picture, the matching area of the second picture comprises a template area of the current picture.

In still further variations of the above embodiment at least a pixel of a part of the block in the current picture is encoded using another inter coding mode than template matching/bilateral matching. The inter coding mode may comprise conventional motion vector signaling, merge or skip mode. Similar to the above embodiment this may be useful when it is not possible to get a good match with conventional template matching/bilateral matching. By intra coding part of the current block it may be possible to get better fixation points for the template matching/bilateral matching since the matching is done for what is in the current block. In variations of this embodiment, an inter coding mode and, when needed, other inter coding parameters are signaled to the decoder relating only to the overlapping part in the current block.

It is noted that template matching/bilateral matching may, according to the present teachings, be combined with only translation as well. In particular, the obtaining of a transformed version of the reference picture comprises only translation and no other geometric transformation. The template area is partially overlapping the prediction area and the pixel(s) in the overlapped area is/are obtained through other means than template matching/bilateral matching. These means may, for instance, comprise intra coding or other modes of inter coding such as explicit motion vector signaling, merge or skip mode.

In a variation of the above embodiment, at least a pixel of a part of the block in the current picture is encoded using intra coding. The part of the block corresponds to the part of the reference picture where the reference matching area and the reference prediction area overlap. In this embodiment a part of the current block, e.g. a sub-block or a small set of pixels at the bottom/right side in a current block or a sparse selection of pixels, is encoded using intra-coding. This may be useful when it is not possible to get a good match with conventional template matching/bilateral matching. By intra coding part of the current block it may be possible to get better fixation points for the template matching/bilateral matching since the matching is done for what is in the current block. In variations of this embodiment, an intra coding mode is signaled to the decoder relating only to the overlapping part in the current block.

Figure 14:
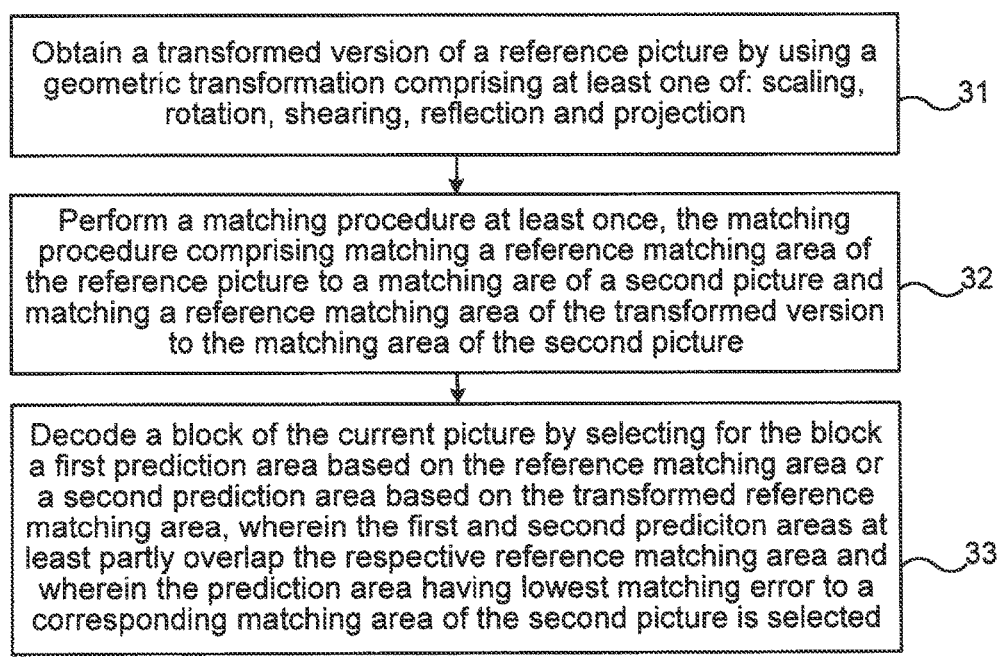
FIG. 14 illustrates a flow chart over steps of a method in a decoder in accordance with the present teachings.

FIG. 14 illustrates a flow chart over steps of a method in a decoder in accordance with the present teachings. It is noted that the method 20 in an encoder described with reference to FIG. 13 corresponds to the below method 30 in a decoder 50, and that advantages corresponding to the above given advantages in relation to the encoder method are obtained also for the below decoder method. Therefore, these advantages are not repeated here, and for such advantages reference is made to the above corresponding embodiments. Further, the respective descriptions of the above encoder embodiments are applicable for the corresponding decoder embodiments below. Therefore, such description is not repeated below, instead reference is made to each corresponding encoder embodiment.

A method 30 performed in a decoder 50 is provided for decoding video pictures into a video bit stream. The method 30 comprises:

obtaining 31 a transformed version 2'; 12', 13' of a reference picture 2; 12, 13, by using a geometric transformation comprising at least one of: scaling, rotation, shearing, reflection, and projection, performing 32 a matching procedure at least once, the matching procedure comprising matching a reference matching area 6; 15, 16 of the reference picture 2; 12, 13 to a matching area 4; 16, 15 of a second picture 1; 13, 12 and matching a reference matching area 6'; 15', 16' of the transformed version 2'; 12', 13' to the matching area 4; 16, 15 of the second picture 1; 13, 12, and decoding 33 a block 3; 14 of the current picture 1; 11 by selecting for the block 3; 14 a first prediction area 5; 15, 16 based on the reference matching area 6; 15, 16 or a second prediction area 5'; 15', 16' based on the transformed reference matching area 6'; 15', 16', wherein the first and second prediction areas at least partly overlap the respective reference matching areas 6; 6'; 15, 16, 15', 16' and wherein the prediction area having lowest matching error to a corresponding matching area 4; 15, 16 of the second picture 1; 13, 12 is selected as prediction for the block.

In an embodiment, the obtaining 31 a transformed version 2'; 12', 13' of the reference picture 2; 12, 13 comprises transforming only the reference matching area 6; 15, 16 and the prediction area.

In various embodiments, the method 30 comprises performing 32 the matching procedure in a lower resolution than the decoding 33.

In various embodiments, the performing the matching procedure comprises obtaining a first set of matches for the reference matching area 6; 15, 16 by using a first sample accuracy and refining the matches of the first set using a second sample accuracy, and wherein the decoding 33 comprises selecting the prediction area among the first set of matches for which the second sample accuracy was used.

In various embodiments, the method 30 comprises receiving, from the encoder 40, information about a candidate match to use among the first set of matches for which the second sample accuracy was used.

In various embodiments, the method 30 comprises receiving, from an encoder 40, information about the geometric transformation to use in the matching procedure the information comprising one or more of: number of combinations to use in the matching procedure, a set of suggested candidate prediction areas, scaling factors to use and angles to use.

In various embodiments, the method 30 comprises receiving, from an encoder 40, an index for a candidate prediction area to use for decoding a block 3; 14, among a set of selected candidate predictions derived during a matching procedure.

In various embodiments, the matching procedure comprises a bilateral matching, and the second picture 13, 12 comprises a second obtained reference picture 13, 12 or a transformed version 13', 12' of the second obtained reference picture 13, 12, wherein the method 20 comprises, during the decoding 33 the block 14:

selecting a third reference prediction area of the second reference picture 13, 12, or a fourth prediction area of the transformed version 13', 12' of the second reference picture 13, 12, deriving a fifth prediction area based on the selected first prediction area and the selected third prediction area or the selected second prediction area and the selected fourth prediction area, and selecting the fifth prediction area for decoding 33 the block 14 of the current picture 11.

In various embodiments, the matching procedure comprises a template matching, and wherein the second picture comprises the current picture 1, the matching area 4 of the second picture comprises a template area of the current picture 1.

In some embodiments, at least a pixel of a part of the block 3; 14 in the current picture 1; 11 is decoded using intra coding, wherein the part of the block 3; 14 corresponds to the part of the reference picture 2; 12, 13; 12', 13' where the reference matching area 6; 15; 16; 15'; 16' and the reference prediction area 5; 15; 16; 15'; 16' overlap.

In still further embodiments at least a pixel of a part of the block in the current picture is decoded using another inter coding mode than template matching/bilateral matching. The inter coding mode may comprise conventional motion vector signaling, merge or skip mode. Similar to the above embodiment this may be useful when it is not possible to get a good match with conventional template matching/bilateral matching. By inter coding part of the current block it may be possible to get better fixation points for the template matching/bilateral matching since the matching is also done for what is in the current block. In variations of this embodiment, an inter coding mode and, when needed, other inter coding parameters are signaled to the decoder relating only to the overlapping part in the current block.

Figure 15:
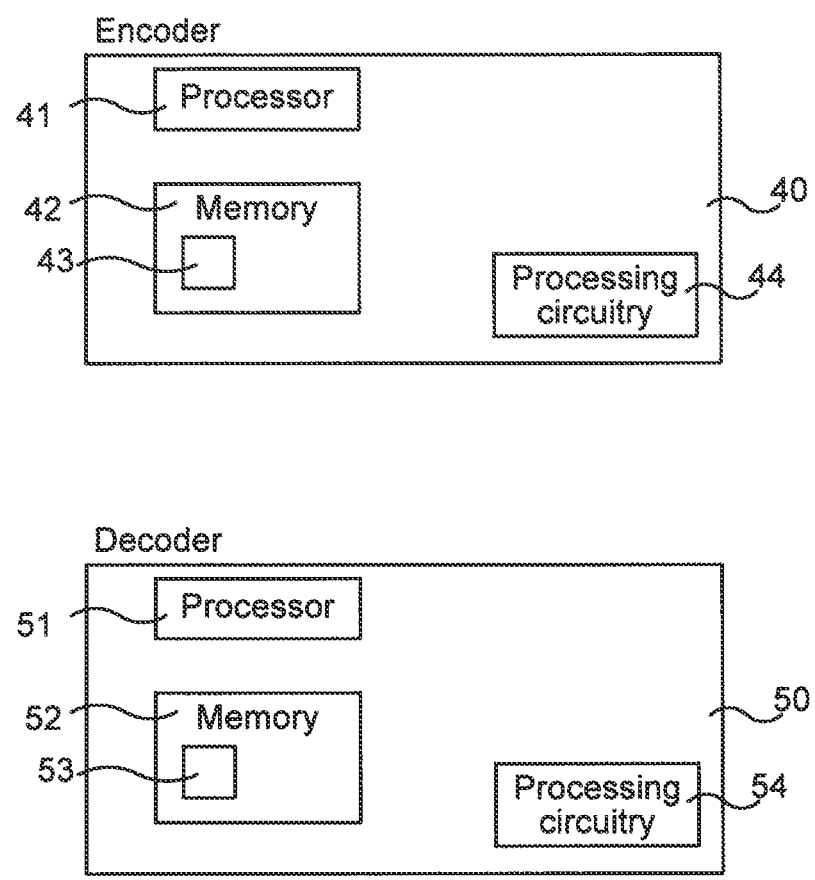
FIG. 15 illustrates schematically an encoder and a decoder and means for implementing embodiments according to the present teachings.

FIG. 15 illustrates schematically an encoder and a decoder and means for implementing embodiments according to the present teachings. The encoder 40 and the decoder 50 each comprises a processor 41, 51 comprising any combination of one or more of a central processing unit (CPU), multiprocessor, microcontroller, digital signal processor (DSP), application specific integrated circuit etc. capable of executing software instructions stored in a memory 42, 52 which can thus be a computer program product. The processor 41 of the encoder 40 can be configured to execute any of the various embodiments of the method 20 for instance as described in relation to FIG. 13. The processor 51 of the decoder 50 can be configured to execute any of the various embodiments of the method 30 for instance as described in relation to FIG. 14.

The memory 42, 52 of the encoder 40 and decoder 50 can be any combination of read and write memory (RAM) and read only memory (ROM), Flash memory, magnetic tape, Compact Disc (CD)-ROM, digital versatile disc (DVD), Blu-ray disc etc. The memory 42, 52 may also comprise persistent storage, which, for example, can be any single one or combination of magnetic memory, optical memory, solid state memory or even remotely mounted memory.

The encoder 40 and the decoder 50 each comprises an interface 44, 54 for communication with other devices. The interface 44, 54 may, for instance, comprise e.g. protocol stacks etc., for communication with other devices, and also an interface for communication with a decoder.

The encoder 40 and the decoder 50 may comprise additional processing circuitry, schematically indicated at reference numerals 45, 55 for implementing the various embodiments according to the present teachings.

An encoder 40 is provided for encoding video pictures into a video bit stream. The encoder 40 is configured to:
 obtain a transformed version 2'; 12', 13' of a reference picture 2; 12, 13, by using a geometric transformation comprising at least one of: scaling, rotation, shearing, reflection, and projection,
 perform a matching procedure at least once, the matching procedure comprising matching a reference matching area 6; 15, 16 of the reference picture 2; 12, 13 to a matching area 4; 16, 15 of a second picture 1; 13, 12 and matching a reference matching area 6'; 15', 16' of the transformed version 2'; 12', 13' to the matching area 4; 16, 15 of the second picture 1; 13, 12, and
 encode a block 3; 14 of the current picture 1; 11 by selecting for the block 3; 14 a first prediction area 5; 15, 16 based on the reference matching area 6; 15, 16 or a second prediction area 5'; 15', 16' based on the transformed reference matching area 6'; 15', 16', wherein the first and second prediction areas at least partly overlap the respective reference matching areas 6; 6'; 15, 16, 15', 16' and wherein the prediction area having lowest matching error to a corresponding matching area 4; 15, 16 of the second picture 1; 13, 12 is selected as prediction for the block.

The encoder 40 may be configured to perform the above steps e.g. by comprising one or more processors 41 and memory 42, the memory 42 containing instructions executable by the processor 41, whereby the encoder 40 is operative to perform the steps.

In an embodiment, the encoder 40 is configured to obtain a transformed version 2'; 12', 13' of the reference picture 2; 12, 13 by transforming only the reference matching area 6; 15, 16 and the prediction area.

In various embodiments, the encoder 40 is configured to perform the matching procedure in a lower resolution than the encoding 23.

In various embodiments, the encoder 40 is configured to perform the matching procedure by obtaining a first set of matches for the reference matching area 6; 15, 16 by using a first sample accuracy and refining the matches of the first set using a second sample accuracy, and configured to encode by selecting the prediction area among the first set of matches for which the second sample accuracy was used.

In a variation of the above embodiment the encoder 40 is configured to signal, to the decoder 50, information about a candidate match to use among the first set of matches for which the second sample accuracy was used.

In various embodiments, the encoder 40 is configured to signal, to a decoder 50, information about the geometric transformation to use in the matching procedure the information comprising one or more of: number of combinations to use in the matching procedure, a set of suggested candidate prediction areas, scaling factors to use and angles to use.

In various embodiments, the encoder 40 is configured to configured to signal, to a decoder 50, an index for a candidate prediction area to use for decoding a block 3; 14, among a set of selected candidate predictions derived at the decoder 50 during a matching procedure.

In various embodiments, the matching procedure comprises a bilateral matching, and wherein: the second picture 13, 12 comprises a second obtained reference picture 13, 12 or a transformed version 13', 12' of the second obtained reference picture 13, 12, and the encoder 40 is configured to, during the encoding the block 14:
 select a third reference prediction area of the second reference picture 13, 12, or a fourth prediction area of the transformed version 13', 12' of the second reference picture 13, 12,
 derive a fifth prediction area based on the selected first prediction area and the selected third prediction area or the selected second prediction area and the selected fourth prediction area, and
 select the fifth prediction area for encoding 23 the block 14 of the current picture 11.

In various embodiments, the matching procedure comprises a template matching, and the second picture comprises the current picture 1, the matching area 4 of the second picture comprises a template area of the current picture 1.

In some embodiments, at least a pixel of a part of the block 3; 14 in the current picture 1; 11 is encoded using intra coding, wherein the part of the block 3; 14 corresponds to the part of the reference picture 2; 12, 13; 12'; 13' where the reference matching area 6; 15; 16; 15'; 16' and the reference prediction area 5; 15; 16; 15'; 16' overlap.

In some embodiments, the encoder 40 is configured to encode at least a pixel of a part of the block in the current picture by using another inter coding mode than template matching/bilateral matching. The encoder 40 may be configured to encode using an inter coding mode selected, for instance, among conventional motion vector signaling, merge or skip mode. As described earlier for the method 20 this may be useful when it is not possible to get a good match with conventional template matching/bilateral matching. In variations of this embodiment, the encoder 40 is configured to signal an inter coding mode and, when needed, other inter coding parameters to the decoder relating only to the overlapping part in the current block.

A decoder 50 is provided for decoding video pictures into a video bit stream. The decoder 50 is configured to:
  obtain a transformed version 2'; 12', 13' of a reference picture 2; 12, 13, by using a geometric transformation comprising at least one of: scaling, rotation, shearing, reflection, and projection,
  perform a matching procedure at least once, the matching procedure comprising matching a reference matching area 6; 15, 16 of the reference picture 2; 12, 13 to a matching area 4; 16, 15 of a second picture 1; 13, 12 and matching a reference matching area 6'; 15', 16' of the transformed version 2'; 12', 13' to the matching area 4; 16, 15 of the second picture 1; 13, 12, and
  decode a block 3; 14 of the current picture 1; 11 by selecting for the block 3; 14 a first prediction area 5; 15, 16 based on the reference matching area 6; 15, 16 or a second prediction area 5'; 15', 16' based on the transformed reference matching area 6'; 15', 16', wherein the first and second prediction areas at least partly overlap the respective reference matching areas 6; 6'; 15, 16, 15', 16' and wherein the prediction area having lowest matching error to a corresponding matching area 4; 15, 16 of the second picture 1; 13, 12 is selected as prediction for the block.

The decoder 50 may be configured to perform the above steps e.g. by comprising one or more processors 51 and memory 52, the memory 52 containing instructions executable by the processor 51, whereby the decoder 50 is operative to perform the steps.

In an embodiment, the decoder 50 is configured to obtain a transformed version 2'; 12', 13' of the reference picture 2; 12, 13 by transforming only the reference matching area 6; 15, 16 and the prediction area.

In various embodiments, the decoder 50 is configured to perform the matching procedure in a lower resolution than the decoding.

In various embodiments, the decoder 50 is configured to perform the matching procedure by obtaining a first set of matches for the reference matching area 6; 15, 16 by using a first sample accuracy and refining the matches of the first set using a second sample accuracy, and configured to decode by selecting the prediction area among the first set of matches for which the second sample accuracy was used.

In a variation of the above embodiment, the decoder 50 is configured to receive, from an encoder 40, information about a candidate match to use among the first set of matches for which the second sample accuracy was used.

In various embodiments, the decoder 50 is configured to receive, from an encoder 40, information about the geometric transformation to use in the matching procedure the information comprising one or more of: number of combinations to use in the matching procedure, a set of suggested candidate prediction areas, scaling factors to use and angles to use.

In various embodiments, the decoder 50 is configured to receive, from an encoder 40, an index for a candidate prediction area to use for decoding a block 3, among a set of selected candidate predictions derived during a matching procedure.

In various embodiments, the matching procedure comprises a bilateral matching, and the second picture 13, 12 comprises a second obtained reference picture 13, 12 or a transformed version 13', 12' of the second obtained reference picture 13, 12, wherein the decoder 50 is configured to, during the decoding the block 14:
  select a third reference prediction area of the second reference picture 13, 12, or a fourth prediction area of the transformed version 13', 12' of the second reference picture 13, 12,
  derive a fifth prediction area based on the selected first prediction area and the selected third prediction area or the selected second prediction area and the selected fourth prediction area, and
  select the fifth prediction area for decoding 33 the block 14 of the current picture 11.

In various embodiments, the matching procedure comprises a template matching, and wherein the second picture comprises the current picture 1, the matching area 4 of the second picture comprises a template area of the current picture 1.

In some embodiments, at least a pixel of a part of the block 3; 14 in the current picture 1; 11 is decoded using intra coding, wherein the part of the block 3; 14 corresponds to the part of the reference picture 2; 12; 13; 12'; 13' where the reference matching area 6; 15; 16; 15'; 16' and the reference prediction area 5 overlap.

In some embodiments, the decoder 50 is configured to decode at least a pixel of a part of the block in the current picture by using another inter coding mode than template matching/bilateral matching. The decoder 50 may be configured to decode using an inter coding mode selected, for instance, among conventional motion vector signaling, merge or skip mode. As described earlier, e.g. in relation to the encoder 40, this may be useful when it is not possible to get a good match with conventional template matching/bilateral matching. In variations of this embodiment, the decoder 50 is configured to receive an inter coding mode and, when needed, other inter coding parameters from the encoder relating only to the overlapping part in the current block.

With reference still to FIG. 15, the present teachings also encompass a computer program 43 for an encoder 40 for encoding video pictures into a video bit stream, and a computer program 53 for a decoder 50 for decoding video picture into a video bit stream. The computer program 43 for the encoder comprises computer program code, which, when executed on at least one processor on the encoder 40, causes the encoder 40 to perform the method 20 according to any of the described embodiments. The computer program 53 for the decoder comprises computer program code, which, when executed on at least one processor on the decoder 50, causes the decoder 50 to perform the method 30 according to any of the described embodiments.

The present teachings also encompasses computer program products 42, 52 for encoders and decoders, respectively, the computer program products 42, 52 comprising a computer program 43, 53 for implementing the embodiments of the methods as described, and a computer readable means on which the computer program 43, 53 is stored. The computer program product, or the memory, thus comprises instructions executable by the processor 41, 51. Such instructions may be comprised in a computer program, or in one or more software modules or function modules. The computer program product 42, 52 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 16:
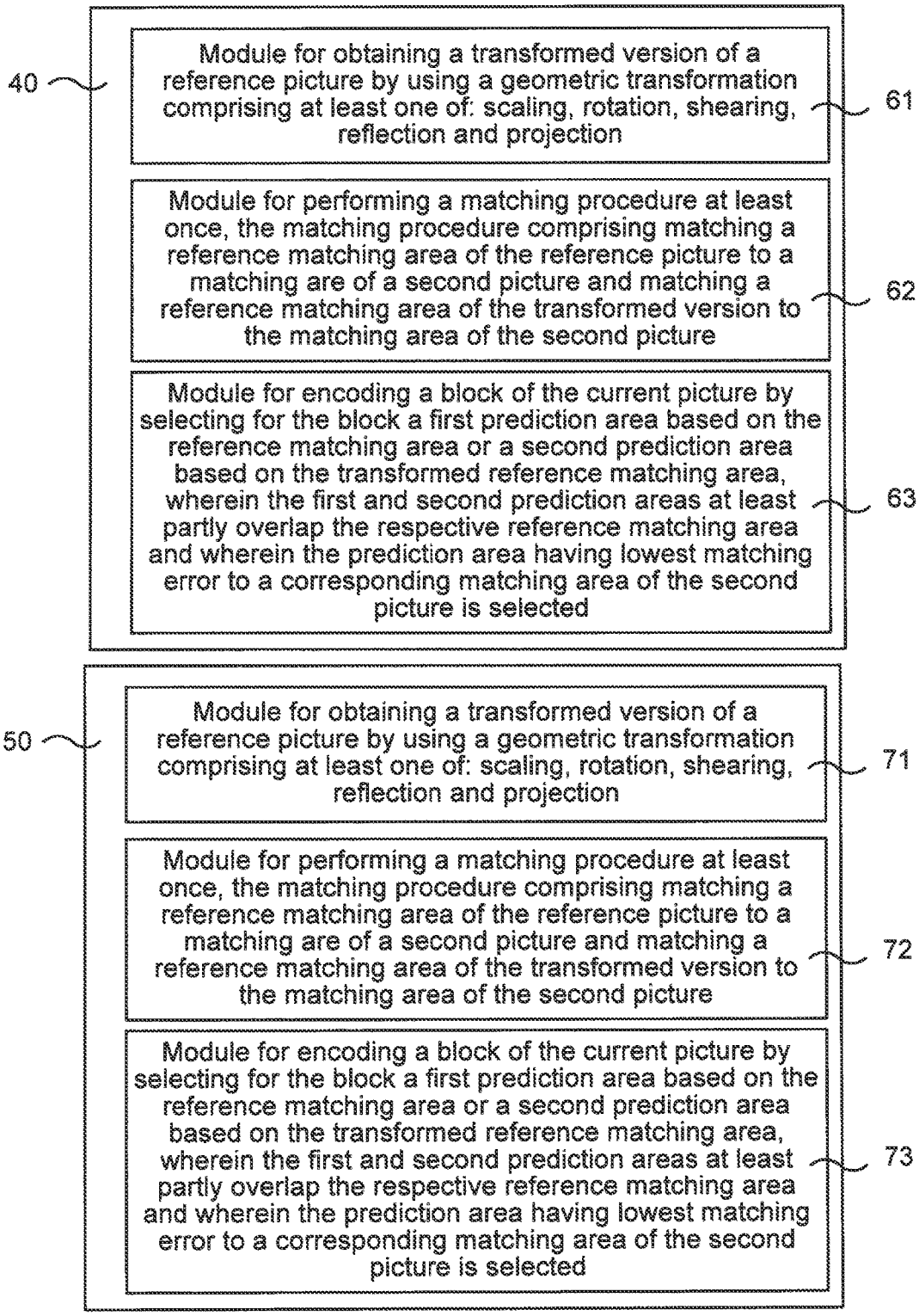
FIG. 16 illustrates an encoder and a decoder comprising function modules/software modules for implementing embodiments according to the present teachings.

FIG. 16 illustrates an encoder 40 and a decoder 50 each comprising function modules/software modules for implementing embodiments according to the present teachings. The function modules can be implemented using software instructions such as computer program executing in a processor and/or using hardware, such as application specific integrated circuits (ASICs), field programmable gate arrays (FPGAs), discrete logical components etc., and any combination thereof. Processing circuitry may be provided, which may be adaptable and in particular adapted to perform any of the steps of the methods 20, 30 that have been described.

An encoder is provided for encoding video pictures into a video bit stream. The encoder comprises a first module 61 for obtaining a transformed version of a reference picture by using a geometric transformation comprising at least one of: scaling, rotation, shearing, reflection and projection. Such first module 61 may for instance comprise processing circuitry adapted to transform reference pictures.

The encoder comprises a second module 62 for performing a matching procedure at least once, the matching procedure comprising matching a reference matching area of the reference picture to a matching are of a second picture and matching a reference matching area of the transformed version to the matching area of the second picture. Such second module 62 may for instance comprise processing circuitry adapted to perform a matching procedure.

The encoder comprises a third module 63 for encoding a block of the current picture by selecting for the block a first prediction area based on the reference matching area or a second prediction area based on the transformed reference matching area, wherein the first and second prediction areas at least partly overlap the respective reference matching area and wherein the prediction area having lowest matching error to a corresponding matching area of the second picture is selected as prediction for the block. Such third module 63 may, for instance, comprise processing circuitry adapted for encoding of blocks.

It is noted that one or more of the modules 61, 62, 63 may be replaced by units. FIG. 16 also illustrates a decoder comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described.

A decoder is provided for decoding video pictures into a video bit stream. The decoder comprises a first module 71 for obtaining a transformed version of a reference picture by using a geometric transformation comprising at least one of: scaling, rotation, shearing, reflection and projection. Such first module 71 may for instance comprise processing circuitry adapted to transform reference pictures.

The decoder comprises a second module 72 for performing a matching procedure at least once, the matching procedure comprising matching a reference matching area of the reference picture to a matching are of a second picture and matching a reference matching area of the transformed version to the matching area of the second picture. Such second module 72 may for instance comprise processing circuitry adapted to perform a matching procedure.

The decoder comprises a third module 73 for decoding a block of a current picture by selecting for the block a first prediction area based on the reference matching area or a second prediction area based on the transformed reference matching area, wherein the first and second prediction areas at least partly overlap the respective reference matching area and wherein the prediction area having lowest matching error to a corresponding matching area of the second picture is selected as prediction for the block.

It is noted that one or more of the modules 71, 72, 73 may be replaced by units.

The described encoder 40 and decoder 50 may be implemented in different ways as have been described. They may, for instance, be implemented as downloadable instructions to be run on a processor, e.g. downloadable in the form of application program or application software (commonly known as an "app"). The encoder and decoder may, for instance, be implemented in (e.g. be downloaded to) a camera, a tablet, a set-top box, a personal computer, smart phone or any device wherein encoding and/or decoding is needed. In other embodiments, the encoder and decoder are implemented in hardware or hardware and software in such device.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in an encoder for encoding video pictures into a video bit stream, the method comprising:
   obtaining a current picture;
   obtaining a reference picture, wherein the reference picture either precedes or follows the current picture in a display order for the video pictures;
   transforming the reference picture using a geometric transformation comprising at least one of: scaling, rotation, shearing, reflection, and projection, thereby generating a transformed reference picture;
   matching a reference matching area of the reference picture to a matching area of the current picture;
   matching a reference matching area of the transformed reference picture to the matching area of the current picture;
   determining a prediction area of the reference picture, wherein the prediction area of the reference picture at least partly overlaps the reference matching area of the reference picture;
   determining a prediction area of the transformed reference picture, wherein the prediction area of the transformed reference picture at least partly overlaps the reference matching area of the transformed reference picture;
   determining a first matching error for the prediction area of the reference picture;
   determining a second matching error for the prediction area of the transformed reference picture;
   comparing the first matching error with the second matching error to determine which matching error is lower than the other;
   selecting one of the prediction area of the reference picture and the prediction area of the transformed reference picture based on a result of the comparing step, wherein the prediction area of the reference picture is selected if the first matching error is lower than the second matching error and the prediction area of the transformed reference picture is selected if the second matching error is less than the first matching error; and
   encoding a block of the current picture using the selected prediction area.

2. The method as claimed in claim 1, wherein transforming the reference picture consists of transforming only the reference matching area of the reference picture and the prediction area of the reference picture.

3. The method as claimed in claim 1, wherein the matching is performed in a lower resolution than the encoding.

4. The method as claimed in claim 1, wherein the performing the matching procedure comprises obtaining a first set of matches for the reference matching area by using a first sample accuracy and refining the matches of the first set using a second sample accuracy, and wherein the encoding comprises selecting the prediction area among the first set of matches for which the second sample accuracy was used.

5. The method as claimed in claim 4, comprising signaling, to the decoder, information about a candidate match to use among the first set of matches for which the second sample accuracy was used.

6. The method as claimed in claim 1, comprising signaling, to a decoder, information about the geometric transformation to use in the matching procedure the information comprising one or more of: number of combinations to use in the matching procedure, a set of suggested candidate prediction areas, scaling factors to use and angles to use.

7. The method as claimed in claim 1, comprising signaling, to a decoder, an index for a candidate prediction area to use for decoding a block, among a set of selected candidate predictions derived at the decoder during a matching procedure.

8. The method as claimed in claim 1, wherein the matching procedure comprises a bilateral matching, and wherein:
the second picture comprises a second obtained reference picture or a transformed version of the second obtained reference picture, wherein the method comprises, during the encoding the block:
selecting a third reference prediction area of the second reference picture, or a fourth prediction area of the transformed version of the second reference picture,
deriving a fifth prediction area based on the selected first prediction area and the selected third prediction area or the selected second prediction area and the selected fourth prediction area, and
selecting the fifth prediction area for encoding the block of the current picture.

9. The method as claimed in claim 1, wherein the matching procedure comprises a template matching, and wherein the second picture comprises the current picture, and the matching area of the second picture comprises a template area of the current picture.

10. The method as claimed in claim 1, wherein at least a pixel of a part of the block in the current picture is encoded using intra coding, wherein the part of the block corresponds to the part of the reference picture where the reference matching area and the reference prediction area overlap.

11. A computer program product comprising a non-transitory computer readable medium storing a computer program for an encoder for encoding video pictures into a video bit stream, the computer program comprising computer program code, which, when executed on at least one processor on the encoder causes the encoder to perform the method according to claim 1.

12. An encoder for encoding video pictures into a video bit stream, the encoder being configured to perform a process comprising:
obtaining a current picture;
obtaining a reference picture, wherein the reference picture either precedes or follows the current picture in a display order for the video pictures;
transforming the reference picture using a geometric transformation comprising at least one of: scaling, rotation, shearing, reflection, and projection, thereby generating a transformed reference picture;
matching a reference matching area of the reference picture to a matching area of the current picture;
matching a reference matching area of the transformed reference picture to the matching area of the current picture;
determining a prediction area of the reference picture, wherein the prediction area of the reference picture at least partly overlaps the reference matching area of the reference picture;
determining a prediction area of the transformed reference picture, wherein the prediction area of the transformed reference picture at least partly overlaps the reference matching area of the transformed reference picture;
determining a first matching error for the prediction area of the reference picture;
determining a second matching error for the prediction area of the transformed reference picture;
comparing the first matching error with the second matching error to determine which matching error is lower than the other;
selecting one of the prediction area of the reference picture and the prediction area of the transformed reference picture based on a result of the comparing step, wherein the prediction area of the reference picture is selected if the first matching error is lower than the second matching error and the prediction area of the transformed reference picture is selected if the second matching error is less than the first matching error; and
encoding a block of the current picture using the selected prediction area.

13. The encoder as claimed in claim 12, wherein transforming the reference picture consists of transforming only the reference matching area of the reference picture and the prediction area of the reference picture.

14. The encoder as claimed in claim 12, wherein the matching is performed in a lower resolution than the encoding.

15. The encoder as claimed in claim 12, configured to perform the matching procedure by obtaining a first set of matches for the reference matching area by using a first sample accuracy and refining the matches of the first set using a second sample accuracy, and configured to encode by selecting the prediction area among the first set of matches for which the second sample accuracy was used.

16. The encoder as claimed in claim 15, configured to signal, to the decoder, information about a candidate match to use among the first set of matches for which the second sample accuracy was used.

17. The encoder as claimed in claim 12, configured to signal, to a decoder, information about the geometric transformation to use in the matching procedure the information comprising one or more of: number of combinations to use in the matching procedure, a set of suggested candidate prediction areas, scaling factors to use and angles to use.

18. The encoder as claimed in claim 16, configured to signal, to a decoder, an index for a candidate prediction area to use for decoding a block, among a set of selected candidate predictions derived at the decoder during a matching procedure.

19. The encoder as claimed in claim 12, wherein the matching procedure comprises a bilateral matching, and wherein:

the second picture comprises a second obtained reference picture or a transformed version of the second obtained reference picture, wherein the encoder is configured to, during the encoding the block:
   select a third reference prediction area of the second reference picture, or a fourth prediction area of the transformed version of the second reference picture,
   derive a fifth prediction area based on the selected first prediction area and the selected third prediction area or the selected second prediction area and the selected fourth prediction area, and
   select the fifth prediction area for encoding the block of the current picture.

20. The encoder as claimed in claim 12, wherein the matching procedure comprises a template matching, and wherein the second picture comprises the current picture, and the matching area of the second picture comprises a template area of the current picture.

21. The encoder as claimed in claim 19, where at least a pixel of a part of the block in the current picture is encoded using intra coding, wherein the part of the block corresponds to the part of the reference picture where the reference matching area and the reference prediction area overlap.

22. A method performed in a decoder for decoding video pictures into a video bit stream, the method comprising:
   obtaining a current picture;
   obtaining a reference picture, wherein the reference picture either precedes or follows the current picture in a display order for the video pictures;
   transforming the reference picture using a geometric transformation comprising at least one of: scaling, rotation, shearing, reflection, and projection, thereby generating a transformed reference picture;
   matching a reference matching area of the reference picture to a matching area of the current picture;
   matching a reference matching area of the transformed reference picture to the matching area of the current picture;
   determining a prediction area of the reference picture, wherein the prediction area of the reference picture at least partly overlaps the reference matching area of the reference picture;
   determining a prediction area of the transformed reference picture, wherein the prediction area of the transformed reference picture at least partly overlaps the reference matching area of the transformed reference picture;
   determining a first matching error for the prediction area of the reference picture;
   determining a second matching error for the prediction area of the transformed reference picture;
   comparing the first matching error with the second matching error to determine which matching error is lower than the other;
   selecting one of the prediction area of the reference picture and the prediction area of the transformed reference picture based on a result of the comparing step, wherein the prediction area of the reference picture is selected if the first matching error is lower than the second matching error and the prediction area of the transformed reference picture is selected if the second matching error is less than the first matching error; and
   decoding a block of the current picture using the selected prediction area.

23. The method as claimed in claim 22, wherein transforming the reference picture consists of transforming only the reference matching area of the reference picture and the prediction area of the reference picture.

24. The method as claimed in claim 22, wherein the matching is performed in a lower resolution than the encoding.

25. The method as claimed in claim 22, wherein the performing the matching procedure comprises obtaining a first set of matches for the reference matching area by using a first sample accuracy and refining the matches of the first set using a second sample accuracy, and wherein the decoding comprises selecting the prediction area among the first set of matches for which the second sample accuracy was used.

26. The method as claimed in claim 25, comprising receiving, from the encoder, information about a candidate match to use among the first set of matches for which the second sample accuracy was used.

27. The method as claimed in claim 22, comprising receiving, from an encoder, information about the geometric transformation to use in the matching procedure the information comprising one or more of: number of combinations to use in the matching procedure, a set of suggested candidate prediction areas, scaling factors to use and angles to use.

28. The method as claimed in claim 22, comprising receiving, from an encoder, an index for a candidate prediction area to use for decoding a block, among a set of selected candidate predictions derived during a matching procedure.

29. The method as claimed in claim 22, wherein the matching procedure comprises a bilateral matching, and wherein:
   the second picture comprises a second obtained reference picture or a transformed version of the second obtained reference picture, wherein the method comprises, during the decoding the block:
      selecting a third reference prediction area of the second reference picture, or a fourth prediction area of the transformed version of the second reference picture,
      deriving a fifth prediction area based on the selected first prediction area and the selected third prediction area or the selected second prediction area and the selected fourth prediction area, and
      selecting the fifth prediction area for decoding the block of the current picture.

30. The method as claimed in claim 22, wherein the matching procedure comprises a template matching, and wherein the second picture comprises the current picture, the matching area of the second picture comprises a template area of the current picture.

31. The method as claimed in claim 29, where at least a pixel of a part of the block in the current picture is decoded using intra coding, wherein the part of the block corresponds to the part of the reference picture where the reference matching area and the reference prediction area overlap.

32. A computer program product comprising a non-transitory computer readable medium storing a computer program for a decoder for decoding video pictures from a video bit stream, the computer program comprising computer program code, which, when executed on at least one processor on the decoder causes the decoder to perform the method according to claim 22.

33. A decoder for decoding video pictures into a video bit stream, the decoder being configured to perform a process comprising:
   obtaining a current picture;
   obtaining a reference picture, wherein the reference picture either precedes or follows the current picture in a display order for the video pictures;

transforming the reference picture using a geometric transformation comprising at least one of: scaling, rotation, shearing, reflection, and projection, thereby generating a transformed reference picture;

matching a reference matching area of the reference picture to a matching area of the current picture;

matching a reference matching area of the transformed reference picture to the matching area of the current picture;

determining a prediction area of the reference picture, wherein the prediction area of the reference picture at least partly overlaps the reference matching area of the reference picture;

determining a prediction area of the transformed reference picture, wherein the prediction area of the transformed reference picture at least partly overlaps the reference matching area of the transformed reference picture;

determining a first matching error for the prediction area of the reference picture;

determining a second matching error for the prediction area of the transformed reference picture;

comparing the first matching error with the second matching error to determine which matching error is lower than the other;

selecting one of the prediction area of the reference picture and the prediction area of the transformed reference picture based on a result of the comparing step, wherein the prediction area of the reference picture is selected if the first matching error is lower than the second matching error and the prediction area of the transformed reference picture is selected if the second matching error is less than the first matching error; and decoding a block of the current picture using the selected prediction area.

34. The decoder as claimed in claim 33, wherein transforming the reference picture consists of transforming only the reference matching area of the reference picture and the prediction area of the reference picture.

35. The decoder as claimed in claim 33, wherein the matching is performed in a lower resolution than the encoding.

36. The decoder as claimed in claim 33, configured to perform the matching procedure by obtaining a first set of matches for the reference matching area by using a first sample accuracy and refining the matches of the first set using a second sample accuracy, and configured to decode by selecting the prediction area among the first set of matches for which the second sample accuracy was used.

37. The decoder as claimed in claim 36, configured to receive, from an encoder, information about a candidate match to use among the first set of matches for which the second sample accuracy was used.

38. The decoder as claimed in claim 33, configured to receive, from an encoder, information about the geometric transformation to use in the matching procedure the information comprising one or more of: number of combinations to use in the matching procedure, a set of suggested candidate prediction areas, scaling factors to use and angles to use.

39. The decoder as claimed in claim 33, configured to receive, from an encoder, an index for a candidate prediction area to use for decoding a block, among a set of selected candidate predictions derived during a matching procedure.

40. The decoder as claimed in claim 33, wherein the matching procedure comprises a bilateral matching, and wherein:
the second picture comprises a second obtained reference picture or a transformed version of the second obtained reference picture, wherein the decoder is configured to, during the decoding the block:
select a third reference prediction area of the second reference picture, or a fourth prediction area of the transformed version of the second reference picture,
derive a fifth prediction area based on the selected first prediction area and the selected third prediction area or the selected second prediction area and the selected fourth prediction area, and
select the fifth prediction area for decoding the block of the current picture.

41. The decoder as claimed in claim 33, wherein the matching procedure comprises a template matching, and wherein the second picture comprises the current picture, the matching area of the second picture comprises a template area of the current picture.

42. The decoder as claimed in claim 40, where at least a pixel of a part of the block in the current picture is decoded using intra coding, wherein the part of the block corresponds to the part of the reference picture where the reference matching area and the reference prediction area overlap.

* * * * *